US012747040B1

(12) United States Patent
Wuerl et al.

(10) Patent No.: US 12,747,040 B1
(45) Date of Patent: Sep. 29, 2026

(54) REUSABLE SEPARATION SYSTEM FOR ROCKET FAIRING AND PAYLOAD

(71) Applicant: Blue Origin Manufacturing, LLC, Huntsville, AL (US)

(72) Inventors: Adam M. Wuerl, Seattle, WA (US); Joseph Paul Atkinson, Melbourne, FL (US); Todd James Buchholz, Sun Prairie, WI (US); David Alan Degenhardt, Seattle, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 0 days.

(21) Appl. No.: 19/091,753

(22) Filed: Mar. 26, 2025

(51) Int. Cl.
*B64G 1/64* (2006.01)
*B64G 1/58* (2006.01)
*B64G 1/62* (2006.01)

(52) U.S. Cl.
CPC ............. *B64G 1/6457* (2023.08); *B64G 1/58* (2013.01); *B64G 1/62* (2013.01); *B64G 1/641* (2013.01)

(58) Field of Classification Search
CPC .......... B64G 1/64; B64G 1/641; B64G 1/644; B64G 1/645; B64G 1/6457
See application file for complete search history.

(56) References Cited

U.S. PATENT DOCUMENTS 3,352,192 A * 11/1967 Webb ...................... F42B 15/36 102/378
4,896,847 A 1/1990 Gertsch
5,115,708 A * 5/1992 Spariat ................... B64G 1/641 102/378
5,248,233 A * 9/1993 Webster ................ F16B 5/0208 102/377
5,312,152 A * 5/1994 Woebkenberg, Jr. .. B64G 1/641 60/528
5,653,549 A 8/1997 Geyer et al.
5,829,253 A * 11/1998 Long ........................ B64G 1/64 60/528

(Continued)

FOREIGN PATENT DOCUMENTS

CN 109229433 B 4/2020
CN 114194422 A 3/2022

(Continued)

OTHER PUBLICATIONS

Drescher, Oliver, "Cork Based Thermal Protection System for Sounding Rocket Applications—Development and Flight Testing", 23rd ESA PAC Symposium 2017, Jun. 1, 2017, 9 pages.

(Continued)

*Primary Examiner* — Joshua J Michener
*Assistant Examiner* — Cindi M Curry
(74) *Attorney, Agent, or Firm* — Knobbe, Martens, Olson & Bear, LLP

(57) ABSTRACT

A separation system for a rocket having a payload release assembly and a fairing release assembly. Release devices secure and then separate the payload and fairing from the rocket. The release devices have rotatable bolts that retract. The release devices are cooled to survive reentry and may then be reused. A heat shield at the forward end of the rocket allows for reuse of the rocket and separation system. The rocket may be a reusable, upper (e.g. second) stage rocket.

20 Claims, 16 Drawing Sheets

(56) References Cited

U.S. PATENT DOCUMENTS

| | | | | |
|---|---|---|---|---|
| 6,126,115 | A * | 10/2000 | Carrier | B64G 1/641 294/82.26 |
| 6,758,142 | B1 | 7/2004 | Seaquist | |
| 6,789,767 | B2 | 9/2004 | Mueller et al. | |
| 10,072,915 | B2 | 9/2018 | Medina et al. | |
| 10,934,029 | B2 | 3/2021 | Bower et al. | |
| 12,366,218 | B2 * | 7/2025 | Horn | F02K 9/42 |
| 2003/0141416 | A1 | 7/2003 | Telford | |
| 2006/0097113 | A1 * | 5/2006 | Landsberg | B64G 1/6457 244/137.4 |
| 2009/0127399 | A1 | 5/2009 | Mueller et al. | |
| 2015/0050078 | A1 | 2/2015 | Laughlin | |
| 2021/0094707 | A1 | 4/2021 | Houghton et al. | |
| 2022/0194635 | A1 | 6/2022 | Aston et al. | |
| 2022/0194636 | A1 | 6/2022 | Freestone et al. | |
| 2024/0083601 | A1 * | 3/2024 | Johnson | B64G 1/643 |
| 2024/0132234 | A1 * | 4/2024 | Cespedosa Castán | B64G 1/641 |

FOREIGN PATENT DOCUMENTS

| | | | |
|---|---|---|---|
| CN | 112340069 | B | 10/2022 |
| CN | 116119041 | A | 5/2023 |
| DE | 1506134 | A1 | 4/1970 |
| EP | 2161199 | A1 | 3/2010 |
| FR | 2693978 | A1 | 1/1994 |
| JP | H08219134 | A | 8/1996 |

OTHER PUBLICATIONS

Finkbeiner, Joshua R. et al., “Apollo Seals: A Basis for the Crew Exploration Vehicle Seals”, Nov. 2006, 31 pages.

Pan, Xueting et al., “Reusable SMA Actuated Non-explosive Lock-release Mechanism for Space Application”, International Journal of Smart and Nano Materials 11(1): 65-77, Jan. 6, 2020, 14 pages. URL:https://doi.org/10.1080/19475411.2019.1711462.

“PSR 1575 mm”, SatCatalog, Oct. 11, 2022, 4 pages. URL: https://www.satcatalog.com/component/psr-1575-mm/.

Rogers, William F. et al., “Pyrotechnic Shock at the Orbiter/External Tank Forward Attachment”, The 11$^{th}$ Space Simulation Conf., 33-42, Jan. 1, 1980, 10 pages.

“Space Shuttle Program Payload Bay Payload User’s Guide”, National Aeronautics and Space Administration, Dec. 2000, 255 pages.

“SpaceX—Starship Users Guide”, Space Exploration Technologies Corp., Mar. 2020, 6 pages.

* cited by examiner

REUSABLE SEPARATION SYSTEM FOR ROCKET FAIRING AND PAYLOAD

BACKGROUND

Field

The technology relates generally to separation systems for a rocket, and more specifically a reusable fairing and payload separation system for reusable second stage rockets.

Description of the Related Art

Launch vehicles transport payloads such as spacecraft into orbit or to other planetary bodies. The vehicle may include multiple stages, such as a first stage rocket for initial launch and a second stage rocket for delivering the payload to the final destination. Traditional stages for launch vehicles cannot survive the environment upon reentry to earth's atmosphere. Thus any systems for supporting and separating a component, such as a payload or the fairing, from the vehicle are typically expendable and thus non-reusable. Such systems are therefore not intended to withstand reentry through the atmosphere. Even for reusable rockets, such as reusable first or second stages, typical separation systems are jettisoned or otherwise non-reusable, for example due to damage upon reentry. Therefore, there exists a need for improvements to these and other drawbacks of traditional rocket separation systems.

SUMMARY

Each embodiment disclosed herein has several aspects, no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing approaches to rocket separation systems for fairings and payloads.

In some aspects, a release device for a separation system of a rocket includes a tubular body extending along a longitudinal axis from a proximal end to a distal end and defining a channel extending axially therethrough; and a bolt including an axially extending shaft configured to be positioned within the channel of the tubular body and a transversely elongated head on a distal end of the shaft, wherein the bolt is configured to rotate about the longitudinal axis from a first position where the head is configured to engage an expendable component and a second position where the head is configured to disengage from the expendable component to thereby allow the bolt to translate proximally through the channel and allow the expendable component to separate from the rocket.

In some aspects, the release device further includes a transverse actuation arm configured to rotate the shaft.

In some aspects, the release device further includes a biasing element configured to bias the bolt proximally.

In some aspects, the head is configured to engage a seat of the expendable component, the seat defining a transversely elongated slot.

In some aspects, a proximal surface of the head is helical.

In some aspects, the release device includes cooling channels extending through the body and the bolt configured to flow coolant therethrough.

In some aspects, the cooling channel extending through the bolt extends to a distal opening at a distal end of the bolt.

In some aspects, the expendable component includes an adaptor or a load spreader.

In some aspects, a release device for an expendable component of a rocket includes a body including a channel extending through the body from a proximal end to a distal end; a bolt including a shaft and a head on a distal end of the shaft; and a cooling system configured to flow coolant to the body and the bolt during reentry of the rocket into the atmosphere so that the release device is reusable.

In some aspects, the bolt is configured to heat up to cause the coolant to boil to prevent a temperature of the bolt from raising above a melting or annealing temperature of the bolt.

In some aspects, the cooling system includes a recess in the head of the bolt, wherein the recess is configured to hold the coolant that boils to cool the head of the bolt during reentry of the rocket through an atmosphere.

In some aspects, the bolt includes a cap coupled to a distal surface of the bolt, wherein the cap includes a plurality of channels, and wherein the coolant is configured to boil in the plurality of channels to vent vapor out of the recess in the head and to a surrounding atmosphere.

In some aspects, the cap includes a material with a high thermal diffusivity.

In some aspects, the bolt includes titanium and/or the body includes aluminum.

In some aspects, the body includes an end cap, and the cooling system includes an annular channel in the end cap.

In some aspects, a method of operating a release device with a component for securement with a rocket includes positioning the component at a distal end of the release device; distally translating a bolt of the release device into a recess of the component; and rotating the bolt from a second position to a first position to engage a head of the bolt with the component.

In some aspects, the method further includes rotationally biasing the bolt towards the first position.

In some aspects, the method further includes proximally biasing the bolt.

In some aspects, the method further includes rotating the bolt from the first position to the second position to disengage the bolt from the component and proximally translating the bolt out of the recess of the component to retract the bolt into a body of the release device.

In some aspects, the method further includes cooling the bolt during reentry of the rocket through an atmosphere.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made without departing from the spirit or scope of the subject matter presented here. It will be readily understood that the aspects of the present disclosure, as generally described herein, and illustrated in the drawings, may be arranged, substituted, combined, and designed in a wide variety of different configurations, all of which are explicitly contemplated and make part of this disclosure.

DETAILED DESCRIPTION

The following detailed description is directed to certain specific embodiments for devices, systems, and methods related to a reusable payload interface for a reusable second stage of a multi-stage launch vehicle. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment is included in at least one embodiment of the present disclosure. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others. Similarly, various requirements are described which may be requirements for some embodiments but may not be requirements for other embodiments. Reference will now be made in detail to embodiments of the present disclosure, examples of which are illustrated in the accompanying drawings. Wherever possible, the same reference numbers will be used throughout the drawings to refer to the same or like parts.

The reusable rockets and associate components described herein may be used for multiple launches and missions. For example, a rocket may be reused more than twenty launches, or more than fifty launches, etc. As such, it is desirable to reuse as many components of the rocket as possible to minimize the cost and turnaround time of missions. The rocket may include many different components, including a separation system for payloads and fairings. For the reusable rockets described herein, the separation system is able to release the payload and fairing from the upper stage of the rocket and survive reentry through the atmosphere. This allows the separation system to be used for multiple launches without refurbishment, or with minimal refurbishment. The separation system or components thereof may be cooled during reentry through the atmosphere. Example separation systems with these and other capabilities are described herein with respect to example rocket configurations. It is understood the separation system, components thereof, and/or methods of cooling may be used with different rocket configurations, to couple or release other components to the rocket, cool other components of the rocket, etc.

Figure 1A:
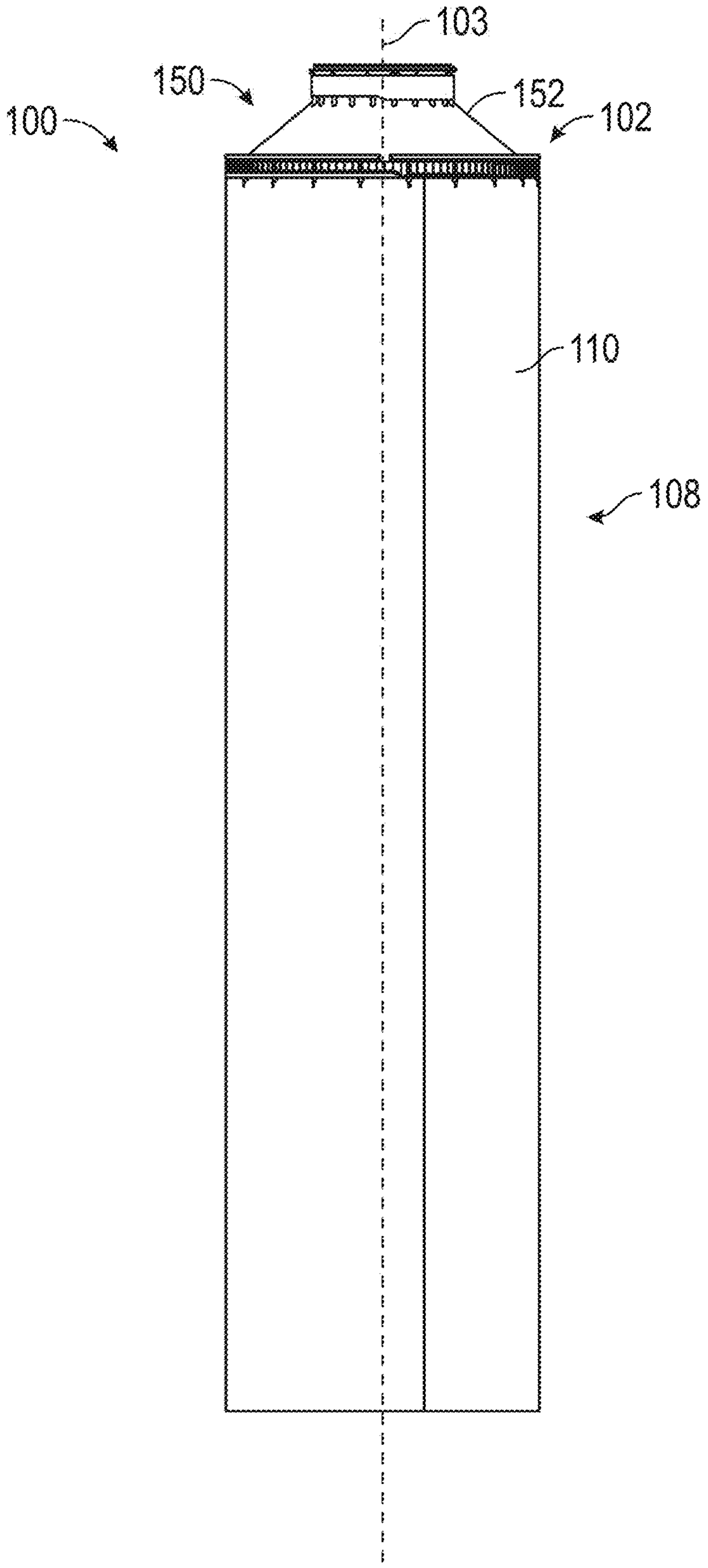
FIG. 1A is a side view of an example rocket, shown as a second stage rocket, with an example separation system having a payload release assembly, a fairing release assembly, and a heat shield.
Figure 1B:
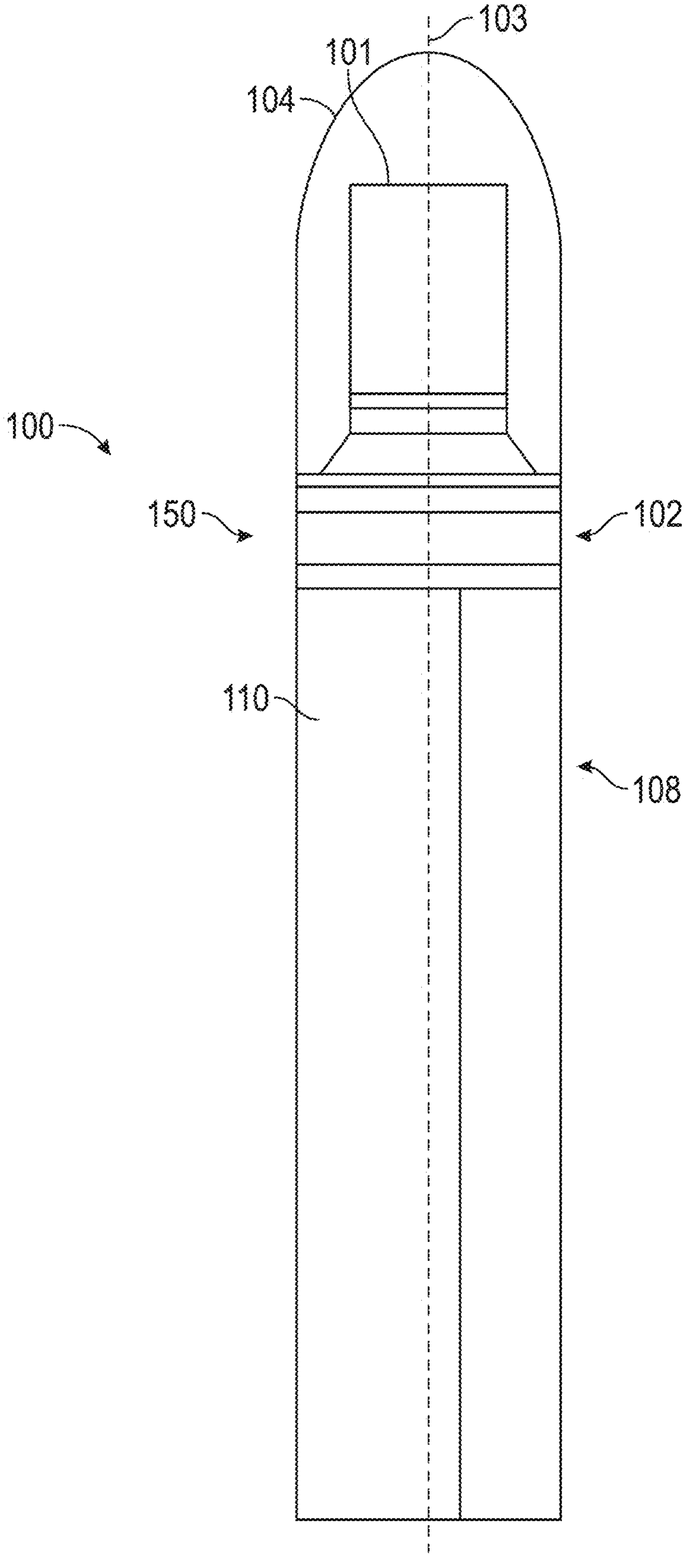
FIG. 1B is a side view of the second stage of FIG. 1A shown with an example payload supported by the payload release assembly and an example fairing (shown transparently) supported by a fairing release assembly.

FIGS. 1A and 1B show an example embodiment of a second stage 100 (e.g., an upper stage) having a separation system 150. The second stage 100 may be used with a first stage as part of a launch vehicle. The separation system 150 may be coupled to and/or form a forward end 102 (e.g., a nose cone) of the second stage 100. FIG. 1A shows the second stage 100 without a payload 101. FIG. 1B shows the second stage 100 with a payload 101 coupled to the second stage 100 via the separation system 150, and a fairing 104 shown transparently for clarity. The second stage 100 and the separation system 150 are provided to complete multiple extraplanetary or orbital missions. Therefore, the second stage 100 and the separation system 150 are reusable for multiple missions.

During a launch mission, the second stage 100 is configured to be coupled with a first stage (e.g., a lower stage, not shown) of the launch vehicle. The first stage is configured for atmospheric launch operation to send the launch vehicle with the second stage 100 and the payload 101 to the upper atmosphere or lower earth orbit. The fairing 104 may be coupled to the second stage 100 and positioned over the payload 101 in order to protect (e.g., prevent or inhibit damage to) the payload 101, the separation system 150 and/or the forward end 102 of the second stage 100 during launch. The second stage 100 is configured to separate from the first stage to deliver the payload 101 to a planned orbit or trajectory. The separation system 150 is configured to release (e.g., separate, decouple, etc.) the payload 101 and the fairing 104 from the second stage 100 after the second stage 100 reaches one or more planned release locations along its path.

After the separation system 150 releases the payload 101 and the fairing 104 from the second stage 100, the second stage 100 reenters the atmosphere and descends back to a planned landing location. When the second stage 100 reenters the atmosphere, atmospheric drag may heat the separation system 150 and any other components of the second stage 100, e.g. to temperatures up to about 2,700 degrees Fahrenheit. The heat encountered during reentry to the atmosphere creates an environment that can cause typical rockets to oxidize, anneal, melt, and/or disintegrate. In accordance with the present disclosure, the separation system 150 and/or other components of the second stage 100 may be configured to survive and avoid such damage, and thus be reusable for multiple missions. The separation system 150 and/or other components of the second stage 100 may be configured to withstand reentry through the atmosphere so the separation system 150 and/or other components of the second stage 100 may be used for subsequent launches with minimal or no refurbishment, repair, etc. For example, after the second stage 100 lands, bolts, such as bolts 304, may be removed from the body of release devices of the separation system 150, such as body 302 of the release device 300, and the bolts may be inspected. In order to reduce or minimize the time required to prepare the second stage 100 for the subsequent launch, a new set of bolts may be inserted into the body of the release devices for the subsequent launch while the removed bolts are inspected. Exposed surfaces of the body of the release devices and corresponding seals, such as seals 274, may be inspected, without removing the body of the release devices from the vehicle. After inspections and any needed repairs or replacements are complete, the release devices of the separation system 150 are ready subsequent launches.

During reentry, the second stage 100 may be oriented so a longitudinal axis 103 of the second stage 100 is inclined at an angle with a direction of flight of the second stage 100 (e.g., an angle of attack). The second stage 100 may "belly flop" through the atmosphere during reentry. In some embodiments, such angle when the second stage 100 reenters the atmosphere may be about 50 degrees, about 55 degrees, about 60 degrees, about 65 degrees, about 70 degrees, about 75 degrees, about 80 degrees, about 85 degrees, about 90 degrees, about 95 degrees, about 100 degrees, about 110 degrees, about 120 degrees, about 130 degrees, about 140 degrees, about 150 degrees, about 160 degrees, about 170 degrees, about 180 degrees, and/or any value between any of the aforementioned values. In some embodiments, the angle when the second stage 100 reenters the atmosphere may be between about 50 degrees and about 100 degrees, or between about 60 degrees and about 90 degrees.

The second stage 100 may reorient as the second stage 100 descends through the atmosphere. After the second stage 100 reorients, the aforementioned angle between the longitudinal axis and the direction of travel may be about 30 degrees, about 35 degrees, about 40 degrees, about 45 degrees, about 50 degrees, about 55 degrees, about 60 degrees, about 65 degrees, about 70 degrees, about 75 degrees, about 80 degrees, about 85 degrees, about 90 degrees, about 95 degrees, and/or any value between any of the aforementioned values. In some embodiments, after the second stage 100 reorients, the angle may be between about 30 degrees and about 95 degrees, or between about 40 degrees and about 85 degrees.

As the second stage 100 reenters the atmosphere and/or descends through the atmosphere, a windward side 108 of the second stage 100 (e.g., a side of the second stage 100 that at least partially faces the direction of flight) and of the separation system 150 (e.g., a windward side 108 of the forward end 102) may be subjected to most or all of the atmospheric drag and resulting heat. Therefore, the windward side 108 of the second stage 100 and/or the separation system 150 may be configured to withstand the heat encountered upon reentry (e.g., heat generated by the atmospheric drag). The second stage 100 may include a heat shield 110 on the windward side 108 of the body of the second stage 100. The separation system 150 may include a heat shield 152 positioned over at least a portion of the separation system 150. The heat shields 110, 152 may protect the second stage 100 and/or the separation system 150 and components thereof from the heat encountered upon reentry, as further described herein. The heat shield 110 and/or 152 may include carbon-carbon (e.g., reinforced carbon-carbon (RCC)), high-temperature refractory metals (e.g., steel, nickel-alloys, etc.), ceramic tiles, flexible blankets of high temperature textiles, low-density insulation materials (e.g., Saffil®), and/or any other suitable insulation materials. In some embodiments, the heat shield 110 and/or 152 may include a multi-layer insulation system including a plurality of suitable insulation materials. In some embodiments, the heat shield 110 and/or 152 may include a carbon-carbon outer layer and a Saffil® inner layer. In some embodiments, the insulation material of the heat shield 110 and/or 152 may be configured to withstand heat via ablation, and/or active cooling via a fluid (e.g., water, hydrogen, etc.) in a closed-loop system or an open-loop system. There may be no heat shield material directly covering the separation interface of the hardpoints, for example the top, exposed part of the release mechanisms. Those portions may be directly exposed to reentry plasma and protected by keeping the material temperature below the melting and oxidation temperature using a cooling system as described herein. The area around the hardpoints may be covered by thermal protection material that is several inches thick. There may be a carbon-carbon cylinder surrounding each hardpoint with redundant seals between the outer cylindrical face of the hardpoint and the carbon-carbon cylinder.

FIGS. 2A-2E illustrate various embodiments of a separation system 250 and/or components thereof. The separation system 250 may be used with a reusable rocket, such as the second stage 100. The separation system 250 may be configured to secure and release a payload and a fairing. The separation system 250 may be configured to secure and release the payload via a payload release system 261A. The separation system 250 may be configured to secure and release a fairing via a fairing release system 261B. The separation system 250 may include a body 253 having a heat shield 252.

Figure 2A:
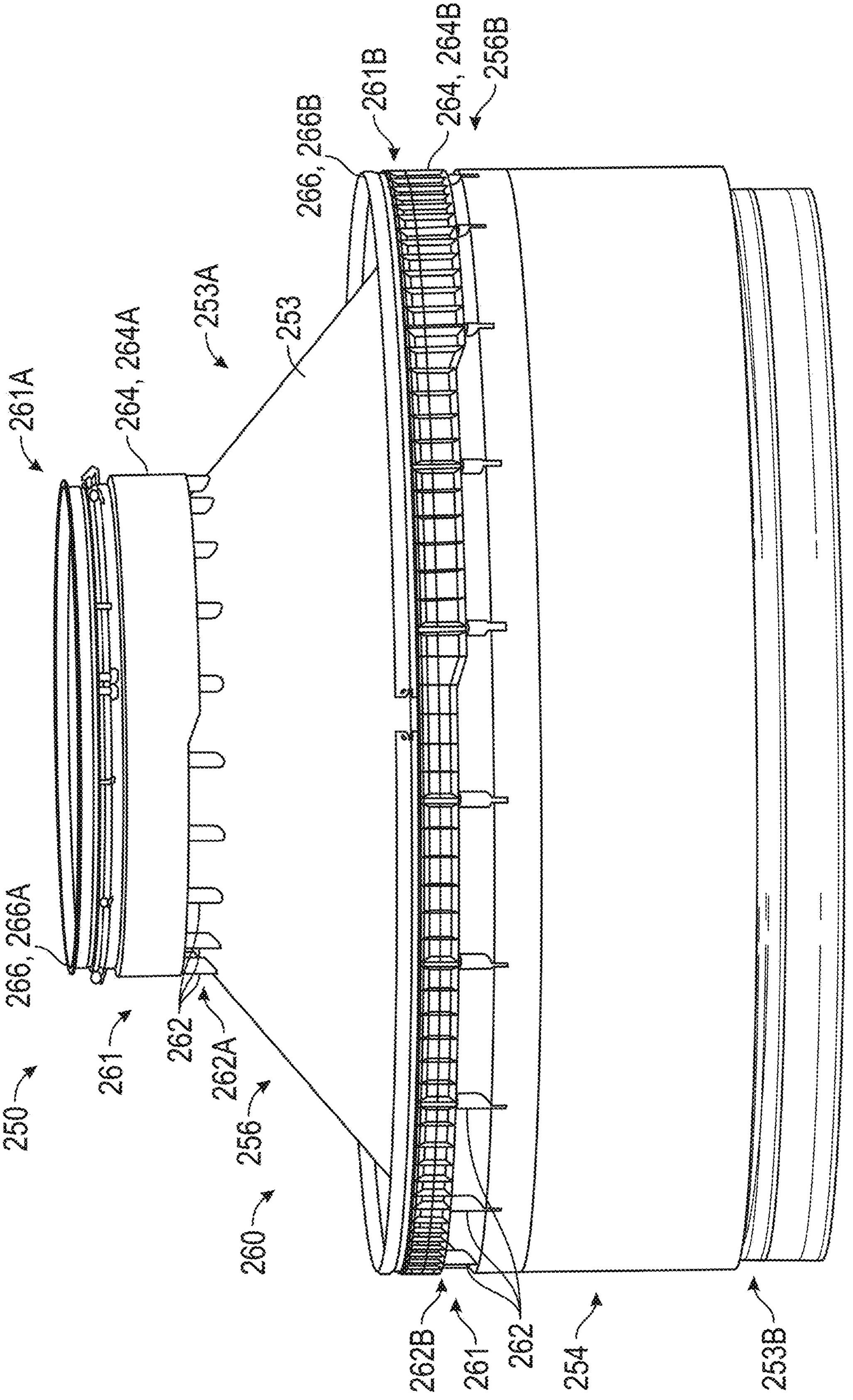
FIG. 2A is a side perspective view of an embodiment of the separation system of FIG. 1A without the heat shield.

As shown in FIG. 2A, the separation system 250 may include the body 253 extending between the payload release system 261A and the fairing release system 261B. The body 253 may be a forward end (e.g., a nose cone) of, or be coupled to a forward end, of the rocket. The body 253 may have a tubular, e.g. cylindrical, shape, and a conical shape. The body 253 may include an aft portion 254 and a forward portion 256. The aft portion 254 may have a cylindrical shape or other tubular shape. The forward portion 256 of the body 253 may have a conical shape, a truncated conical shape, a frustoconical shape or other tapered shape. The forward portion 256 may decrease in transverse width along the forward direction away from the rocket.

In some embodiments, the separation system 250 may include the payload release system 261A and/or the fairing release system 261B. The payload release system 261A may be configured to couple (e.g., secure) a payload 201 to the separation system 250 (e.g., the body 253), as shown in FIG. 2E. The fairing release system 261B may be configured to couple (e.g., secure) a fairing 204 to the separation system 261B.

In some embodiments, the payload release system 261A and/or the fairing release system 261B may include adaptors 266A, 266B. The payload release system 261A may include a payload adaptor 266A and/or the fairing release system 261B may include a fairing adaptor 266B (e.g., fairing frangible joint). In some embodiments, the payload adaptor 266A and/or the fairing adaptor 266B may include a tubular or ring shape. The payload adaptor 266A may be coupled to the payload 201. The fairing adaptor 266B may be coupled to the fairing 204, for example one or more panels forming the fairing. As shown in FIG. 2E, the payload adaptor 266A may be coupled to a perimeter of an aft end 202 of the payload 201. The payload adaptor 266A may be coupled to a perimeter of an aft end 205 of the fairing 204.

In some embodiments, the payload release system 261A and/or the fairing release system 261B may include one or more release devices 262 (for clarity, only some of which are labelled in FIG. 2A). The release devices 262 may be configured to couple (e.g., secure) the payload 201 and/or the fairing 204 to respective portions of the separation system 250. The release devices 262 may be coupled to the body 253. The release devices 262 may be positioned circumferentially around the forward portion 256 of the body 253. Multiple release devices 262 may be circumferentially spaced around the body 253. There may be at least four, at least five, at least six, at least seven, at least eight, at least nine, at least ten, at least eleven, at least twelve, at least thirteen, at least fourteen, at least fifteen, at least sixteen, at least seventeen, at least eighteen, at least nineteen, or at least twenty release devices 262 located within one or both of the payload release system 261A and the fairing release system 261B. In some embodiments, the first set of release devices 262A may include a same number of, fewer, or more release devices 262 as the second set of release devices 262B. The release devices 262 may all be identical to each other. The first set of release devices 262A may be identical to each other, and/or the second set of release devices 262B may be identical to each other. In some embodiments, some of the release devices 262 may have different dimensions to account for local structural differences in the body 253. The release devices 262 may be evenly or unevenly spaced about the respective system. In some embodiments, a distance between the release devices 262 may be longer on a portion of the body 253 that faces a windward side of the second stage rocket than the distance between the release devices 262 on a portion of the body 253 that does not face the windward side of the second stage rocket. Accordingly, in some embodiments, the separation system 250 may include more release devices 262 on the portion of the body 253 that does not face the windward side of the second stage rocket.

In some embodiments, the release devices 262 may support other components of the separation system 250 on the rocket. The release devices 262 may be discrete points along the forward portion 256 of the body 253, such as along the heat shield. The heat shield may not be able to withstand the loads required to attach the payload 201 and/or the fairing 204. Thus, the release devices 262 are required. In some embodiments each release device 262 may be configured to withstand loads (e.g., compression and/or tension) of at least 50 kips, at least 60 kips, at least 67 kips, at least 70 kips, or at least 80 kips.

In some embodiments, the adaptors 266A, 266B may not be configured to withstand point loads. As described above, the release devices 262 may be spaced apart. Therefore, if the release devices 262 were coupled directly to the adaptors 266A, 266B, the release devices 262 may apply point loads to the adaptors 266A, 266B. Accordingly, the payload release system 261A may include a payload load spreader 264A and/or the fairing release system 261B may include a fairing load spreader 264B. The payload load spreader 264A and/or the fairing load spreader 264B may include an aluminum alloy (e.g., 7050 Aluminum) and/or any other suitable material. The payload load spreader 264A may be attached with the payload adaptor 266A. The fairing load spreader 264B may be attached with the fairing adaptor 266B. The load spreaders 264A, 264B may have a tubular or ring shape. The release devices 262 may be coupled to the load spreaders 264A, 264B in order to couple the payload 201 and/or the fairing 204 to the separation system 250. The release devices 262 may be distributed circumferentially along the respective load spreader 264A, 264B. The load spreaders 264A, 264B may be coupled to the adaptors 266A, 266B so the load spreaders 264A, 264B are positioned at least partially between the release devices 262 and the adaptors 266A, 266B. The release devices 262 may extend from fixed attachments with the body 253 of the separation system 250, through openings in the load spreaders 264A, 264B, and releasably secure to a forward end of the load spreaders 264A, 264B.

The load spreaders 264A, 264B may convert (e.g., transform) the point loads applied by the release devices 262 to the load spreaders 264A, 264B into line loads. The load spreaders 264A, 264B may spread out or distribute this load and thus apply line loads to the adaptors 266A, 266B. The load spreaders 264A, 264B may spread the point loads applied by the release devices 262 around the adaptors 266A, 266B so portions of the adaptors 266A, 266B aligned with the release devices 262 are not subjected to substantially larger loads than other portions of the adaptors 266A, 266B that are not aligned with the release devices 262. Therefore, the load spreaders 264A, 264B may allow the release devices 262 to couple with adaptors 266A, 266B that are not specifically designed to be used with the separation system 250 and/or the release devices 262. In this way, a variety of different adaptors, such as custom adaptors for a given payload, may be used with the separation system.

In some embodiments, the release devices 262 may decouple from the load spreaders 264A, 264B to thereby release the payload 201 and/or the fairing 204 from the separation system 250 once the second stage rocket reaches one or more planned release points. The load spreaders 264A, 264B and the adaptors 266A, 266B may remain coupled to the respective payload 201 and the fairing 204 after the release devices 262 decouple from the respective load spreaders 264A, 264B. Accordingly, the load spreaders 264A, 264B and the adaptors 266A, 266B may not be coupled to the separation system 250 when the second stage rocket reenters the atmosphere.

In some embodiments, the payload release system 261A may include a first set (e.g., plurality) of the release devices 262A. The fairing release system 261B may include a second set (e.g., plurality) of the release devices 262B. In some embodiments, the first set of release devices 262A may be distributed (e.g., spaced) around the body 253 so the first set of release devices 262A form a ring of release devices 262 around the body 253. In some embodiments, the second set of release devices 262B may be distributed (e.g., spaced) around the body 253 so the second set of release devices 262B form a ring of release devices 262 around the body 253. The first set of release devices 262A may be positioned forward of the second set of release devices 262B. The first set of release devices 262A may be positioned at least partially between the second set of release devices 262B and a forward end 253A of the body 253. The second set of release devices 262B may be positioned aft of (e.g., rearward) the first set of release devices 262A. The second set of release devices 262B may be positioned at least partially between the first set of release devices 262A and an aft end 253B of the body 253. The first set of release devices 262A may be circumferentially distributed around the body 253 at the forward end 253A of the body 253 and configured to retract into the body 253, as further described. The second set of release devices 262B may be circumferentially distributed around the body 253 at an aft end 256B of the forward portion 256 of the body 253 and configured to retract into the body 253, as further described.

In some embodiments, the first set of release devices 262A may be coupled to the payload load spreader 264A to secure the payload load spreader 264A with the body 253. The payload load spreader 264A may be coupled to the payload adaptor 266A so the payload load spreader 264A is positioned at least partially between the payload adaptor 266A and the first set of release devices 262A. The second set of release devices 262B may be coupled to the fairing load spreader 264B to secure the fairing load spreader 264B to the body 253. The fairing load spreader 264B may be coupled to the fairing adaptor 266B so the fairing load spreader 264B is positioned at least partially between the fairing adaptor 266B and the second set of release devices 262B. The release devices 262 may extend through the respective load spreader 264A, 264B, as further described.

The first set of release devices 262A may decouple from the payload load spreader 264A after the second set of release devices 262B decouple from the fairing load spreader 264B and the fairing has separated and fallen away (or actively jettisoned away in some embodiments) from the rocket. In some embodiments, the first set of release devices 262A and the second set of release devices 262B may decouple from the payload load spreader 264A and the fairing load spreader 264B simultaneously.

Figure 2B:
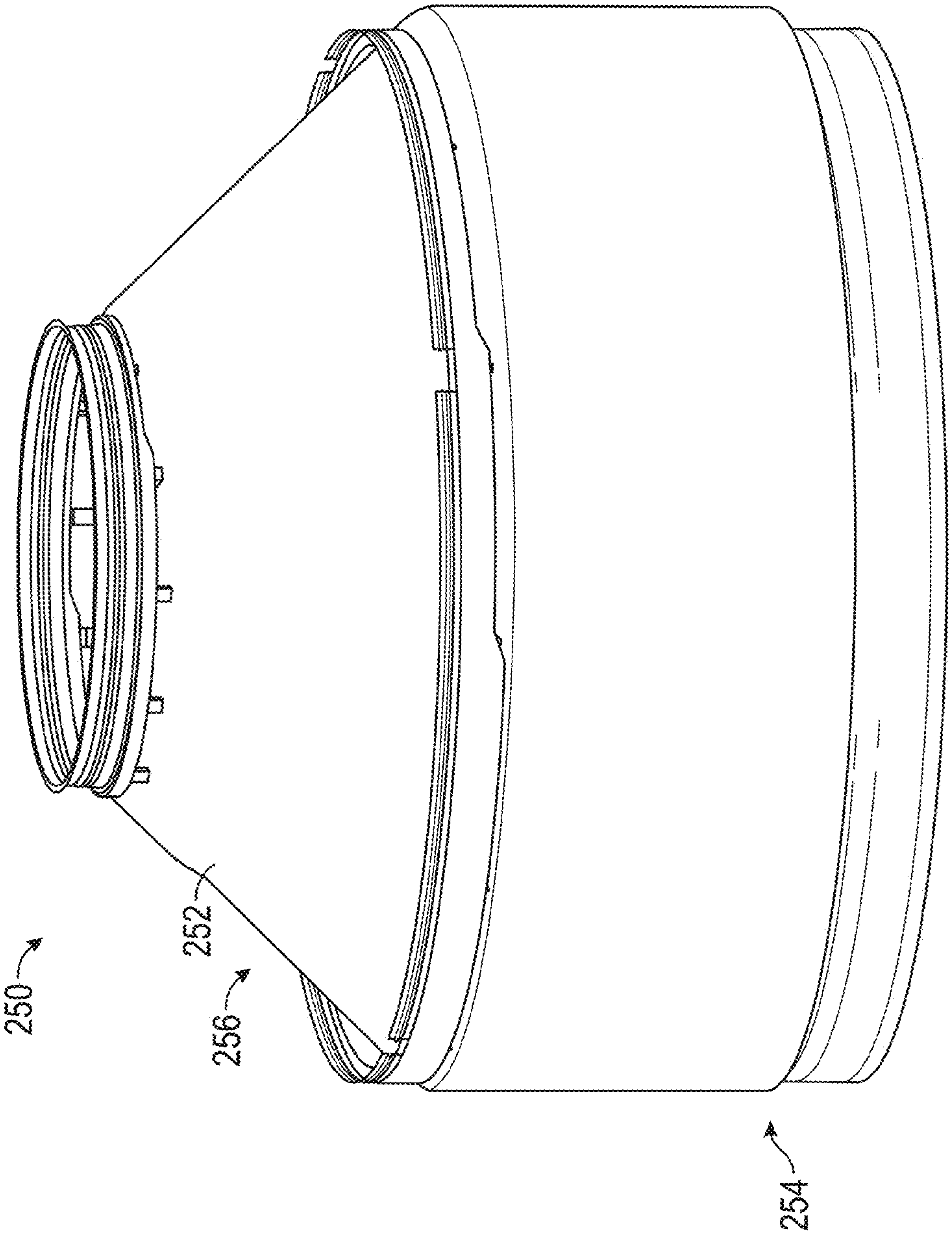
FIG. 2B is a side perspective view of the separation system of FIG. 2A and including the heat shield.

As shown in FIG. 2B, the separation system 250 may include the heat shield 252. The heat shield 252 may be coupled to the body 253 of the separation system 250. The heat shield 252 may be positioned over the body 253 so the heat shield 252 covers the aft portion 254 and the forward portion 256. The heat shield 252 may protect the body 253, the release devices 262, and/or any other components of the separation system 250 from heat generated upon reentry of the second stage rocket through the atmosphere. The heat shield 252 may include any suitable thermal protection system (TPS) materials. The heat shield 252 may include carbon-carbon (e.g., reinforced carbon-carbon (RCC)), high-temperature refractory metals (e.g., steel, nickel-alloys, etc.), ceramic tiles, flexible blankets of high temperature textiles, low-density insulation materials (e.g., Saffil®), and/or any other suitable insulation materials. In some embodiments, the heat shield 252 may include a multi-layer insulation system including a plurality of suitable insulation materials. In some embodiments, the heat shield 252 may include a carbon-carbon outer layer and a Saffil® inner layer. In some embodiments, the insulation material of the heat shield 252 may be configured with withstand heat via ablation, and/or active cooling via a fluid (e.g., water, hydrogen, etc.) in a closed-loop system or an open-loop system. The heat shield 252 may be reusable so the heat shield 252 may be used in a first launch mission and one or more subsequent launch missions.

Figure 2C:
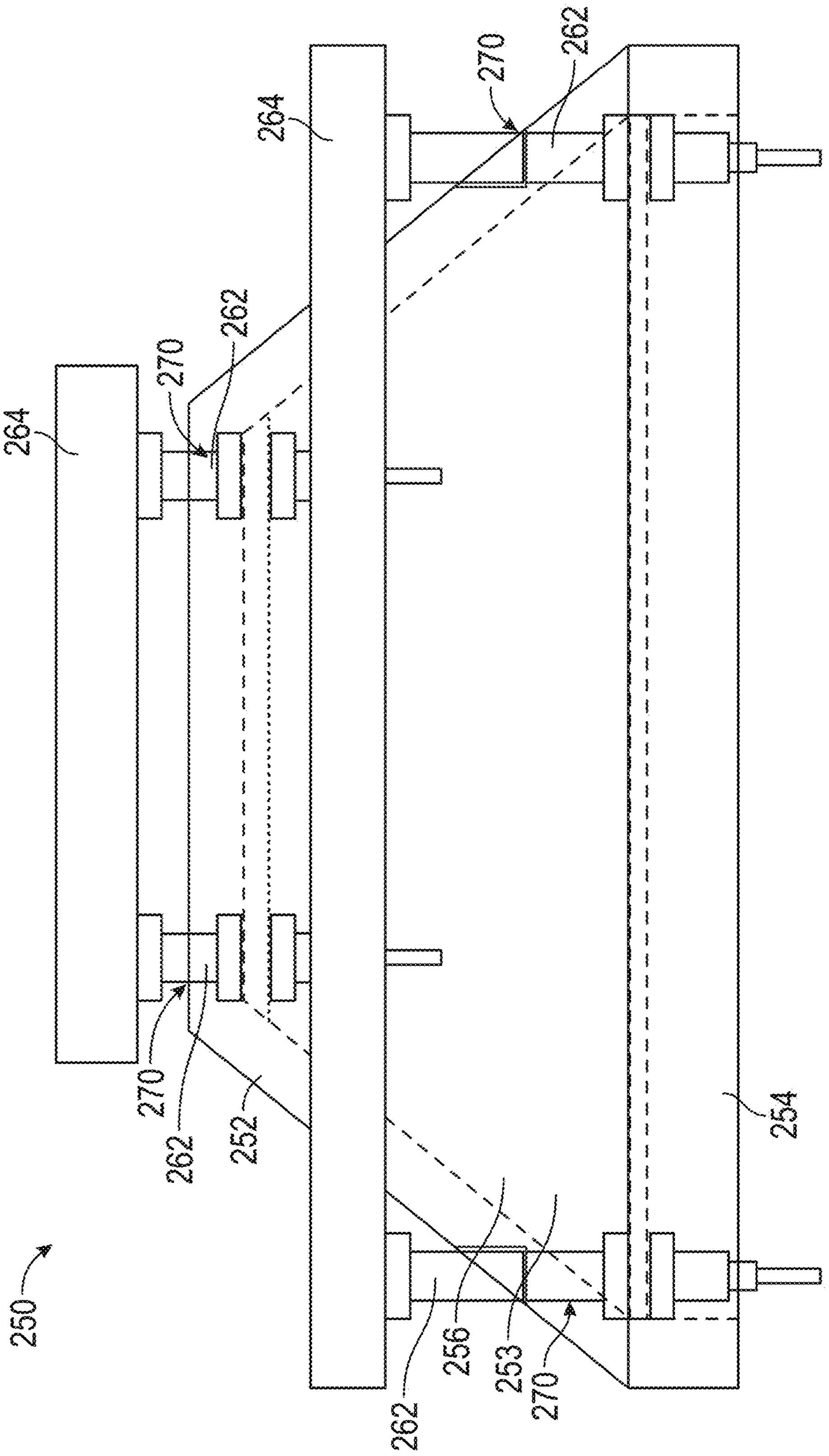
FIG. 2C is a side view of a schematic of an embodiment of payload and fairing release systems that may be used with the separation system of FIG. 2A.
Figure 2D:
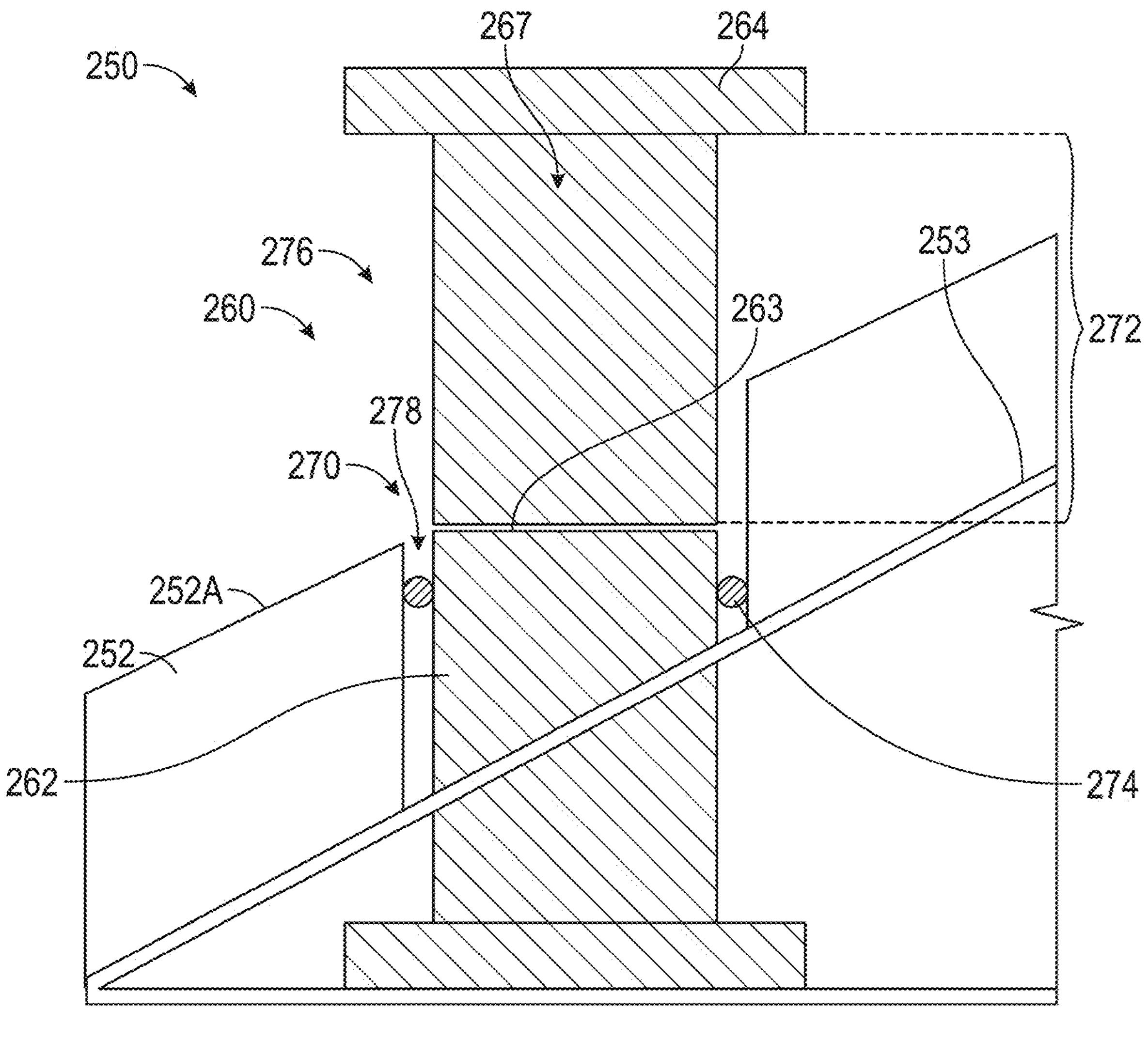
FIG. 2D is a side view of a schematic of a portion of the separation system of FIG. 2B, including a release device, a standoff, a seal, and part of the heat shield.
Figure 2E:
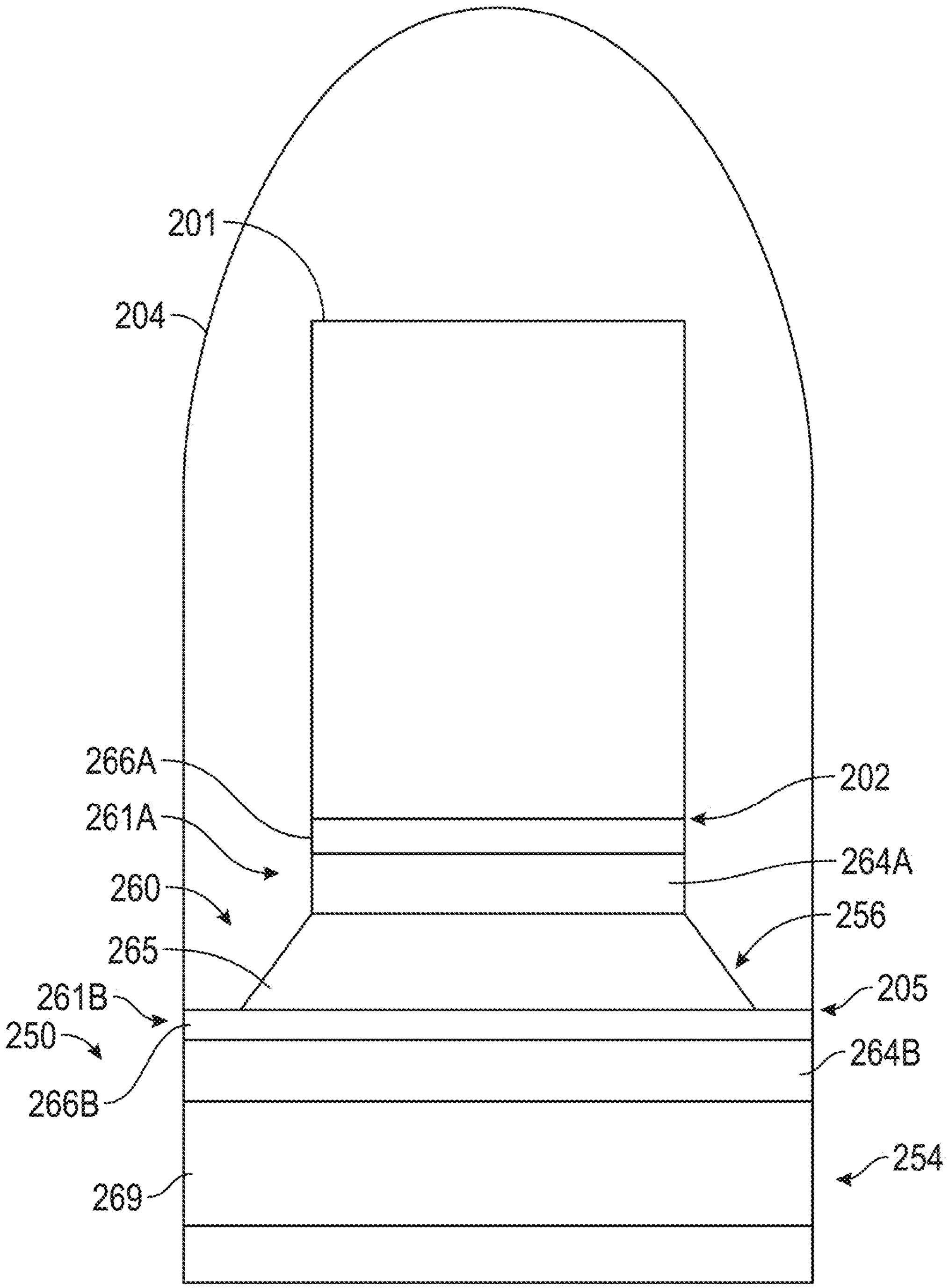
FIG. 2E is a close-up side view of the schematic of the separation system of FIG. 1B supporting an example payload and an example fairing (shown transparently).

FIG. 2C is a cross-sectional side view of a schematic of part of an embodiment of a separation system 250 that may be used with the separation system. FIG. 2D is a side view of a schematic of a portion of an embodiment of the separation system 250, including embodiments of the release device 262, a standoff 267, a seal 274, and part of the heat shield 252. As shown in FIGS. 2C and 2D, in some embodiments, the heat shield 252 may include openings 270 extending therethrough. The release devices 262 may extend partially or completely through the openings 270. Accordingly, the load spreaders 264A, 264B and/or the adaptors 266A, 266B may be positioned external to (e.g., outside) the heat shield 252. Therefore, the heat shield 252 may not prevent or inhibit the load spreaders 264A, 264B and/or the adaptors 266A, 266B from separating from the separation system 250 when the release devices 262 decouple from the load spreaders 264A, 264B.

As shown in FIG. 2D, in some embodiments, the release devices 262 may be coupled to the load spreaders 264A, 264B via standoffs 267. Each standoff 267 may be releasably coupled to a respective one of the release devices 262 and coupled with the respective the load spreaders 264A, 264B. The standoffs 267 may be positioned between the release devices 262 and the load spreaders 264A, 264B. In some embodiments, the standoffs 267 may be attached to or integrated with the load spreaders 264A, 264B. The standoffs 267 may be downward projecting portions of the respective load spreaders 264A, 264B. The release devices 262 may contact and releasably connect with openings in the standoffs 267 in order to align and couple (e.g., secure) the load spreaders 264A, 264B to the separation system 250 (e.g., to the body 253), as further described. The standoffs 267 may position the load spreaders 264A, 264B a distance 272 from the release devices 262. Therefore, in some embodiments, the standoffs 267 may allow a forward end 263 of the release devices 262 to be positioned a least partially in the opening 270 of the heat shield 252 below an outer surface 252A of the heat shield 252. Accordingly, the heat shield 252 may help to protect the release devices 262 from heat encountered upon reentry of the second stage rocket through the atmosphere (e.g., heat generated by atmospheric drag).

In some embodiments, the seal 274 may be positioned between the release devices 262 and the heat shield 252. The seal 274 may prevent or inhibit heat encountered upon reentry of the second stage rocket through the atmosphere from passing through an annular gap 278 formed between the release devices 262 and the heat shield 252. The seal 274 may be a ring-like structure. There may be one or more of the seals 274. The seal 274 may include a high temperature rope seal, a high temperature compound material, and/or any other suitable sealing material. In some embodiments, the seal 274 may include a high temperature rope seal including Saffil® wrapped with an Inconel mesh.

FIG. 2E is a close-up side view of the schematic of the separation system 250 of FIG. 1B supporting an example payload 201 and an example fairing 204 (for clarity, the fairing 204 is shown transparently). As shown in FIG. 2E, in some embodiments, the separation system 250 may include a skirt 269. The skirt 269 may be positioned over at least a portion of the body 253 and/or the heat shield 252. In some embodiments, the skirt 269 may be positioned over the aft portion 254 and/or the forward portion 256 of the body 253. The skirt 269 may be positioned aft (e.g., rearward) of the fairing release system 261B. In some embodiments, the skirt 269 may be coupled to the fairing load spreader 264B. Accordingly, when the second set of release devices 262B decouple from the fairing load spreader 264B, the skirt 269 may remain coupled to the fairing load spreader 264B so the skirt 269 may decouple from the separation system 250 (e.g., the body 253).

In some embodiments, the skirt 269 may reduce or minimize an aerodynamic drag of the separation system 250 when the fairing load spreader 264B is coupled to the separation system 250 via the second set of release devices 262B. The skirt 269 may cover the gap 276 (shown in FIG. 2D) between the fairing load spreader 264B and the heat shield 252. In some embodiments, the skirt 269 may include ventilation (e.g., one or more vents) so a pressure between the skirt 269 and the heat shield 252 can equalize with a pressure outside of the skirt 269. Accordingly, the ventilation may prevent or inhibit formation of a pressure differential across the skirt 269.

In some embodiments, the separation system 250 may include a barrier (e.g., particulate barrier) 265. The barrier 265 may be positioned over the heat shield 252 between the payload release system 261A and the fairing release system 261B (e.g., between the payload load spreader 264A and the fairing load spreader 264B). The barrier 265 may isolate the payload 201 and/or the fairing 204 from the heat shield 252 to prevent or inhibit particles or contaminants from a portion of the heat shield 252 between the payload release system 261A and the fairing release system 261B from contacting the payload 201 and/or the fairing 204. In some embodiments, the barrier 265 may be coupled to the payload load spreader 264A and/or the fairing load spreader 264B so the barrier 265 remains coupled to the payload load spreader 264A and/or the fairing load spreader 264B after the release devices 262 decouple from the load spreaders 264A, 264B.

In some embodiments, the release devices 262 and/or the release systems 261A, 261B may include a cooling system. The cooling system may be configured to cool the release devices 262 and/or other components of the release systems 261A, 261B during reentry of the separation system 250 and/or a reusable second stage rocket through the atmosphere, as further described herein.

FIGS. 3A-4H illustrate various embodiments of a release device 300 for use in a release system, such as the payload release system 261A and/or the fairing release system 261B. Each release system may include a plurality of the release devices 300. The same release device 300 may be used in both the payload release system 261A and/or the fairing release system 261B. In some embodiments, the same basic design for the release device 300 may be used in both release systems 261A, 261B but with different shapes, dimensions, etc., for example for the particular payload and fairing being used. In some embodiments, different embodiments of the release device 300 may be used for each release system 261A, 261B, or even within the same release system. The release device 300 may have the same or similar features as the release device 262, and vice versa, except as otherwise described.

Figure 3A:
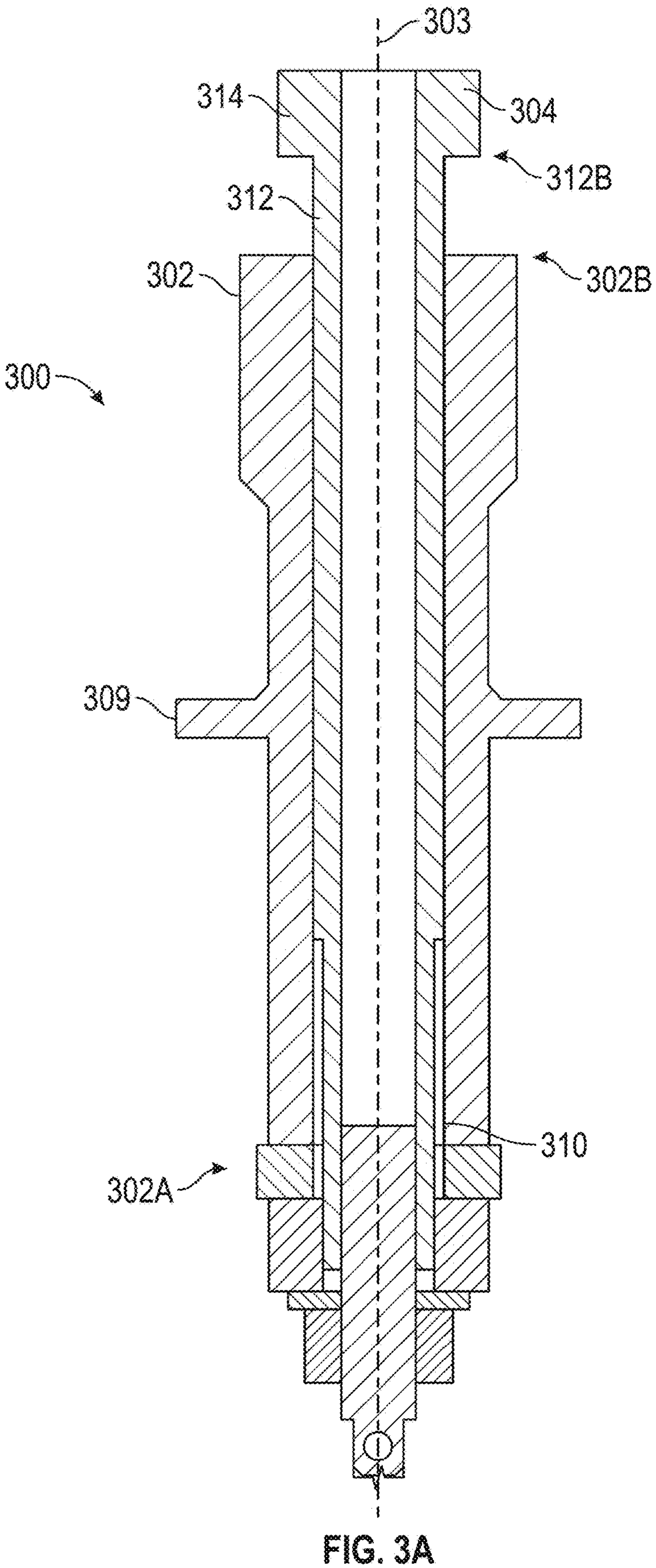
FIG. 3A is a cross-sectional view of an example embodiment of a release device that may be used with the release assemblies of the separation system of FIGS. 1A-2E.

FIG. 3A is a cross-sectional view of the release device 300 (e.g., hardpoint). As shown in FIG. 3A, the release device 300 may include a body 302 and a bolt 304. The release device 300 may act as a combined reusable compression pad and release mechanism. In some embodiments, the body 302 includes an elongated tubular shape. The body 302 may define a channel 310 extending axially or longitudinally through the body 302. The channel 310 may extend along a longitudinal axis 303 extending between a proximal end 302A of the body 302 and a distal end 302B of the body 302. The bolt 304 may be positioned in the channel 310.

The bolt 304 may include an elongated shaft 312 and a head 314. The shaft 312 may be positioned in the channel 310 so the shaft 312 extends longitudinally through the channel 310. The head 314 may be positioned at a distal end 312B of the shaft 312. In some embodiments, the bolt 304, the shaft 312 and/or the head 314 may be formed of titanium, tungsten, other suitable materials, or combinations thereof. The head 314 may contact a corresponding structure such as a standoff (not shown in FIG. 3A), to secure a component (such as a load spreader) with the rocket, as further described.

In some embodiments, the body 302 may include a base 309, such as a flange or lip. The base 309 may extend transversely or radially outward from the body 302. The base 309 may be coupled with the rocket, e.g., a bracket or support, or to a body of the separation system or nose cone. In some embodiments, one or more fasteners 309A, such as a series of bolts as shown in FIG. 3D, may be inserted through the base 309 to couple the base 309 with the rocket.

Figures 3B, 3C:
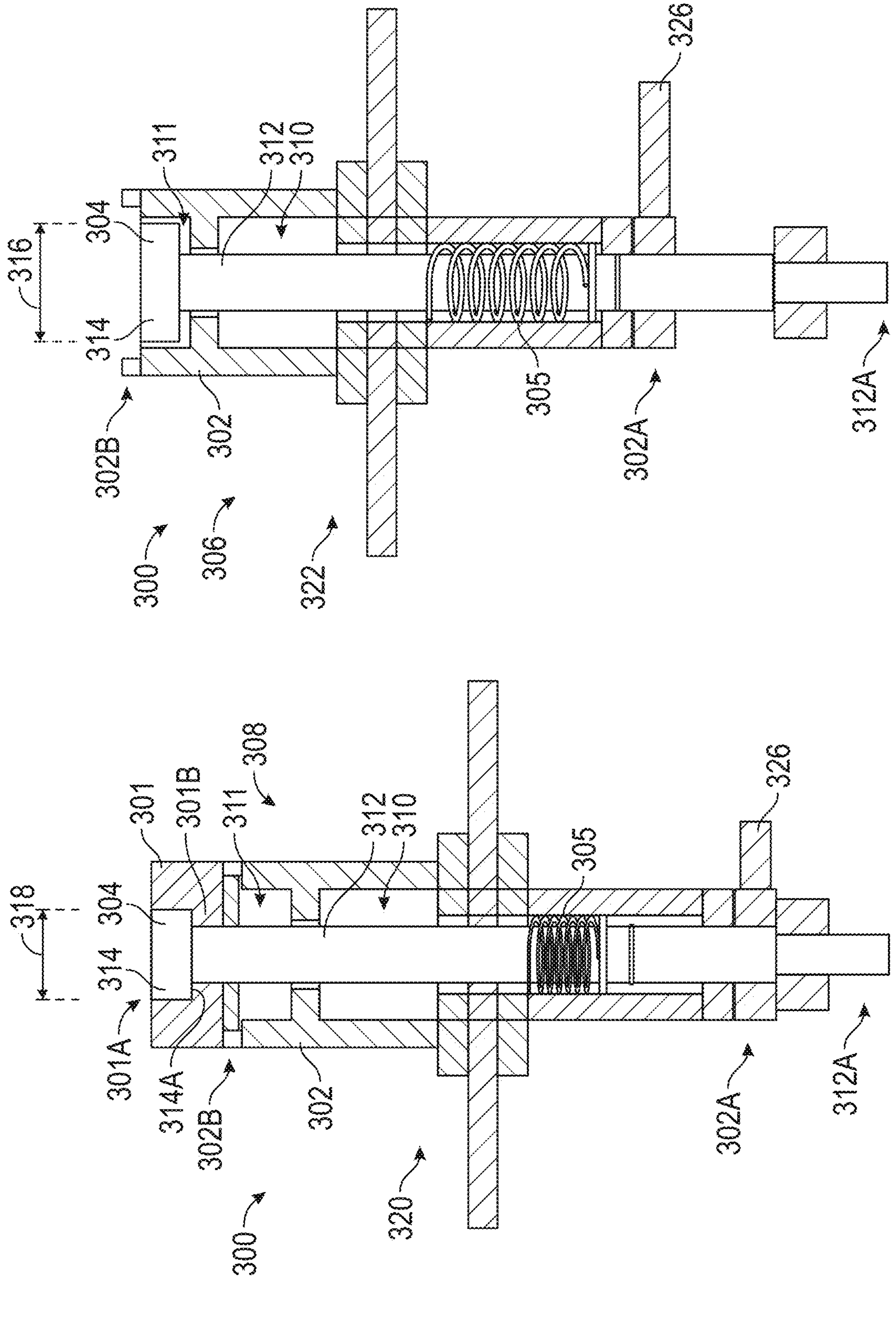
FIG. 3B is a cross-sectional view of an example embodiment of a release device that may be used with the release assemblies of the separation system of FIGS. 1A-2E showing a bolt in an extended position.
FIG. 3C is a cross-sectional view of the release device of FIG. 3B showing the bolt in a retracted position.
Figure 3E:
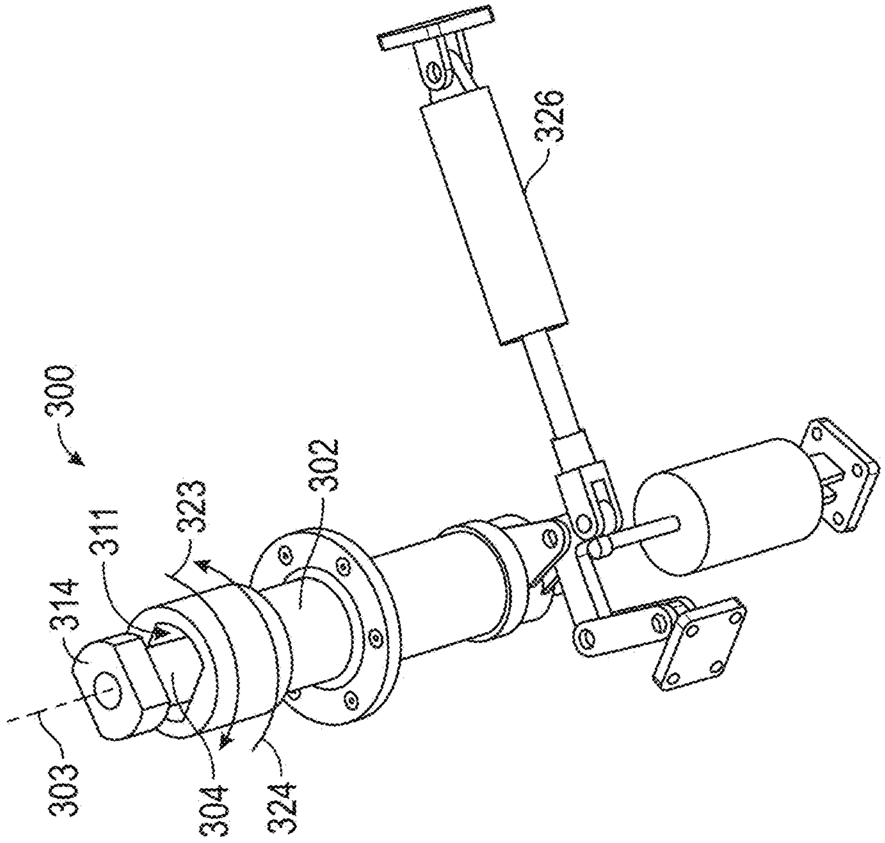
FIGS. 3D-3G are top perspective views of the release device of FIG. 3A sequentially illustrating the bolt rotating from a first position to a second position and translating from the extended position to the retracted position.
Figure 3D:
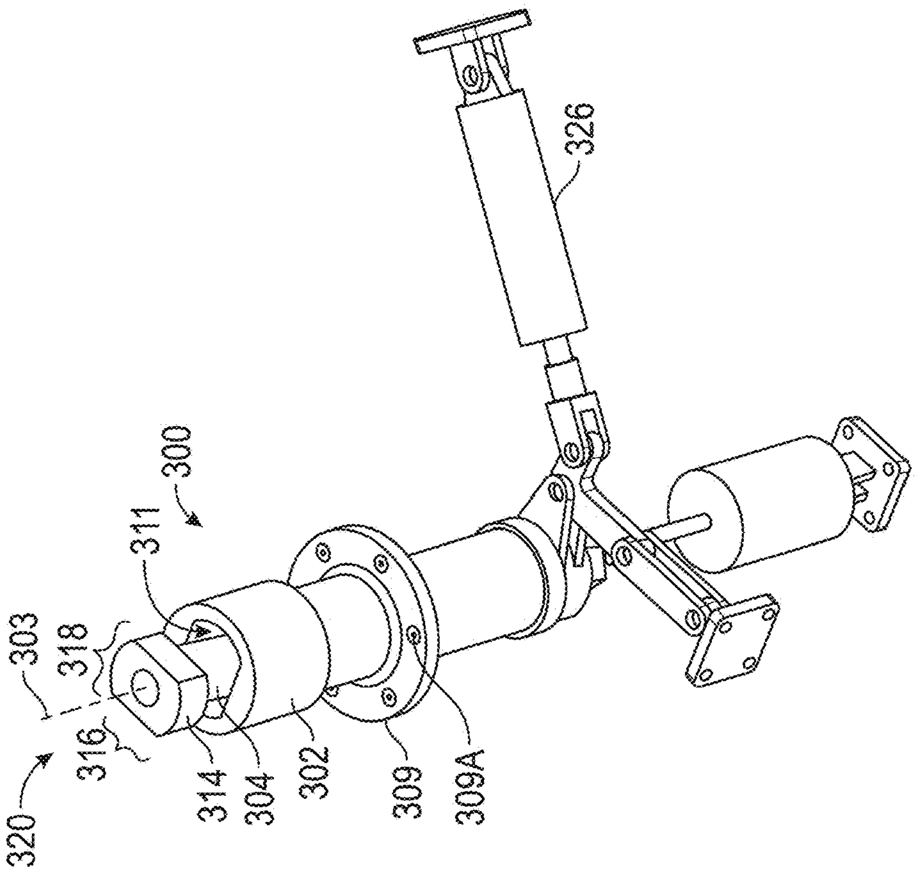

FIGS. 3B and 3C are cross-sectional views of the release device 300 shown respectively in extended (or secured) and retracted (or released) positions. In some embodiments, as shown in FIGS. 3B and 3C, the bolt 304 may be configured to translate through the channel 310 between an extended position 308 and a retracted position 306. When releasing a component, the bolt 304 may translate through the channel 310 towards the proximal end 302A of the body 302 to move from the extended position 308 to the retracted position 306. When being secured with a component, the bolt 304 may translate through the channel 310 towards the distal end 302B of the body 302 to move from the retracted position 306 to the extended position 308.

As shown in FIG. 3B, when the bolt 304 is in the extended position 308, the bolt 304 may be positioned so the shaft 312 partially extends distally out of the channel 310 beyond the distal end 302B of the body 302. Accordingly, the head 314 may be positioned distally of and outside of the channel 310. In some embodiments, the head 314 may be configured to engage with a portion of a connector 301 for a component, which may be a payload connector (e.g., a payload adaptor 266A, a payload load spreader 264A or a standoff 267) or a fairing connector (e.g., a fairing adaptor 266B, a fairing load spreader 264A or a standoff 267). In some embodiments, the connector 301 may include a slot 301A. In some embodiments, the head 314 may be configured to extend into the slot 301A when the bolt 304 is in the extended position 308.

As shown in FIG. 3C, when the bolt 304 is in the retracted position 306, the head 314 may be positioned in the channel 310. In some embodiments, the channel 310 may include a recess 311 at the distal end 302B of the body 302. The recess 311 may be configured to receive the head 314 of the bolt 304. In some embodiments, the recess 311 may include a portion of the channel 310 that may be wider than the rest of the channel 310. The head 314 may be positioned in the recess 311 when the bolt 304 is in the retracted position 306. In some embodiments, a proximal end 312A of the shaft 312 may extend out of the channel 310 past a proximal end 302A of the body 302 when the bolt 304 is in the retracted position 306 and/or the extended position 308. The bolt 304 may retract after being rotated to allow the head 314 to be received in the recess 311, as further described.

In some embodiments, the release device 300 may include a biasing member 305. The biasing member 305 may include a spring. The biasing member 305 may be coupled to the shaft 312. The biasing member 305 may proximally bias the bolt 304 so the bolt 304 is biased towards the retracted position 306. The bolt 304 may be biased but not translate until after being rotated.

Figure 3G:
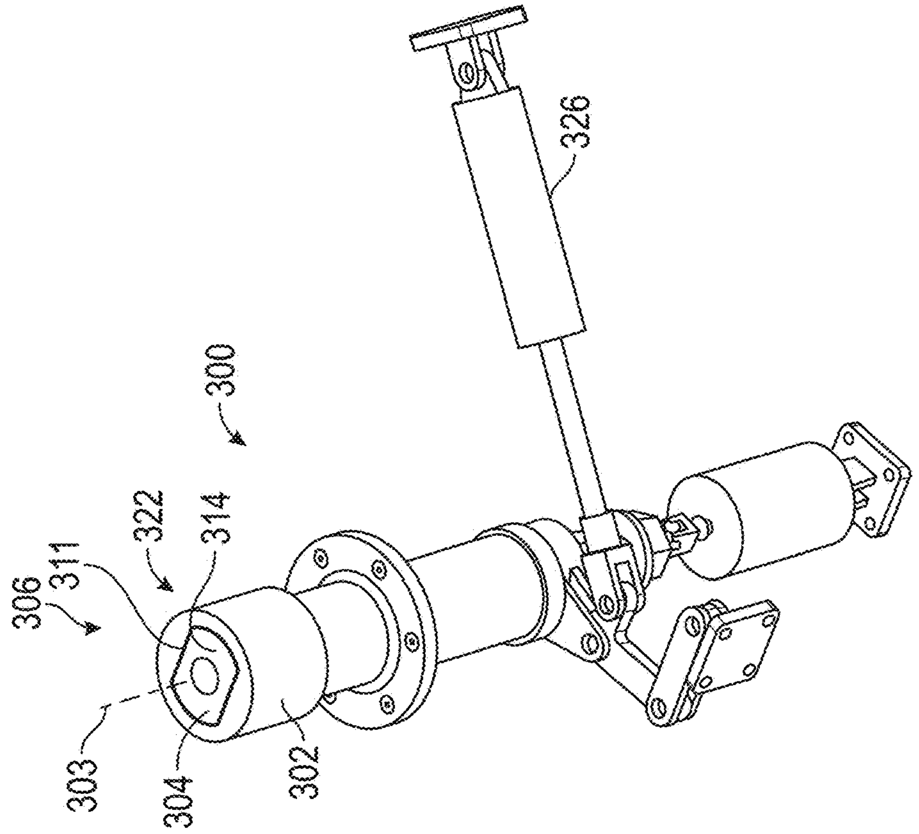
Figure 3F:
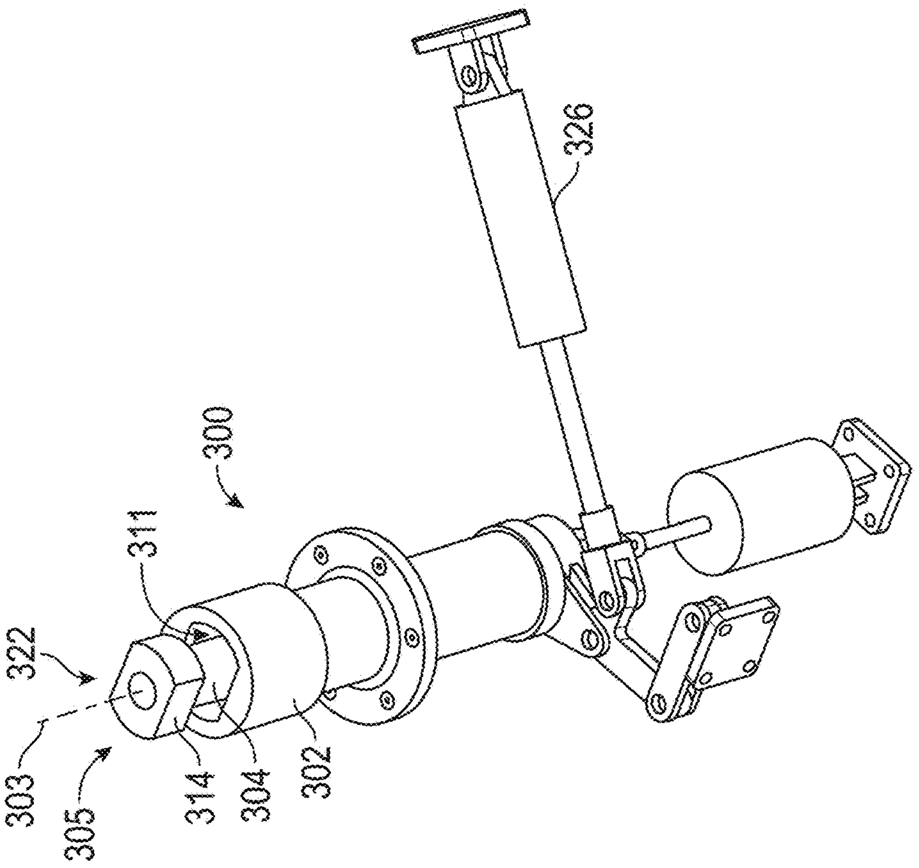

FIGS. 3D-3G are top perspective views of the release device 300 sequentially illustrating the bolt rotating from a first rotational position 320 to a second rotational position 322 and translating from the extended position 308 to the retracted position 306. As shown in FIGS. 3D-3G, the bolt 304 may be configured to be rotated about the longitudinal axis 303 between the first rotational position 320 (FIG. 3D) and the second rotational position 322 (FIG. 3F). The bolt 304 may have an intermediate rotational position or positions, such as that shown in FIG. 3E. The bolt 304 may be configured to rotate from the first rotational position 320 to the second rotational position 322 in a first rotational direction 323, for example when releasing the component. The bolt 304 may retract into the release device 300, as described, with the bolt 304 in the second rotational position 322, as shown in FIG. 3G. The bolt 304 may be configured to rotate from the second rotational position 322 to the first rotational position 320 in an opposite, second rotational direction 324, for example when being secured with the component.

In some embodiments, the bolt 304 may be axially tensioned in the extended position 308 when securing the component. When the bolt 304 is in the first rotational position 320, the head 314 may be configured to engage with, for example contact, and apply a pressure onto a seat 301B (shown in FIG. 3B) of the connector 301. The seat 301B may be a bottom surface of the recess 311. In some embodiments, a proximal surface 314A of the head 314 may be configured to engage with the seat 301B. When the bolt 304 is in the second rotational position 322, and/or while being rotated from the first rotational position 320 to the second rotational position 322, the bolt 304 may be configured to disengage with the seat 301B of the connector 301. The proximal surface 314A and the seat 301B may have corresponding contours to facilitate rotation of the head 314 and disengagement from the connector 301, as further described.

In some embodiments, as shown in FIGS. 3B and 3C, the release device 300 may include an actuator 326. The actuator 326 may be configured to rotate the bolt 304 between the first rotational position 320 and the second rotational position 322. In some embodiments, the actuator 326 may be coupled to or extend from the shaft 312 of the bolt 304. Accordingly, the actuator 326 may be configured to rotate the shaft 312 of the bolt 304. In some embodiments, the actuator 326 may be positioned proximally to the body 302. The actuator 326 may be coupled to a portion of the shaft 312 that extends out of the channel 310 of the body 302 past the proximal end 302A of the body 302. The actuator 326 may include a transverse actuation arm and/or any other actuator configured to rotate the bolt 304 between the first rotational position 320 and the second rotational position 322. The bolt 304 may be rotationally biased (e.g., pretensioned) towards the first rotational position 320 to prevent or inhibit rotation of the bolt 304 in the first rotational direction 323 without the actuator 326 rotating the bolt 304 in the first rotational direction 323.

As shown in FIGS. 3B-3D, the head 314 of the bolt 304 and the slot 301A of the connector 301 may have corresponding shapes or planforms. The head 314 and slot 301A may be elongated. The head 314 may include a length 316 and a width 318. The length 316 may include a distance across the head 314 in a first direction and the width 318 may include a distance across the head 314 in a second direction transverse to (e.g. perpendicular to) the length 316. The length 316 of the head 314 may be greater than the width 318 of the head 314. In some embodiments, the length 316 of the head 314 may include a distance of about 1.0 inch, about 1.5 inches, about 2.0 inches, about 2.5 inches, about 3.0 inches, about 3.5 inches, about 4.0 inches, about 4.5 inches, about 5.0 inches, about 5.5 inches, about 6.0 inches, about 6.5 inches, about 7.0 inches, about 7.5 inches, about 8.0 inches, about 8.5 inches, about 9.0 inches, about 9.5 inches, about 10.0 inches, and/or any value between the aforementioned values. In some embodiments, the width 318 of the head 314 may include a distance of about 0.5 inches, about 1.0 inch, about 1.5 inches, about 2.0 inches, about 2.5 inches, about 3.0 inches, about 3.5 inches, about 4.0 inches, about 4.5 inches, about 5.0 inches, about 5.5 inches, about 6.0 inches, about 6.5 inches, about 7.0 inches, about 7.5 inches, about 8.0 inches, about 8.5 inches, about 9.0 inches, about 9.5 inches, and/or any value between the aforementioned values.

In some embodiments, when the bolt 304 is in the first rotational position 320, the head 314 may extend across the slot 301A of the connector 301. Accordingly, the length 316 of the head 314 may be positioned transverse to a direction of elongation of the slot 301A, so that the seat 301B engages with and prevents axial translation of the head 314. In some embodiments, when the bolt 304 is in the second rotational position 322, the head 314 may align with the slot 301A. Accordingly, the length 316 of the head 314 may be aligned with the elongated dimension of the slot 301A so that the head 314 may translate out of the slot 301A, releasing the component.

In some embodiments, the recess 311 of the channel 310 may include a cross-sectional shape similar to that of the head 314. Accordingly, the recess 311 may be elongated, with a longer length and shorter width. When the bolt 304 is in the first rotational position 320, the head 314 may be positioned so the length 316 of the head 314 extends transverse to the direction of elongation of the recess 311, as shown in FIG. 3D. When the bolt 304 is in the second rotational position 322, the length 316 of the head 314 may be aligned with the elongated dimension of the recess 311, as shown in FIG. 3F. Accordingly, as shown in FIGS. 3F and 3G, the bolt 304 may translate from the extended position 308 to the retracted position 306 when the bolt 304 is in the second rotational position 322. The head 314

Figure 3H:
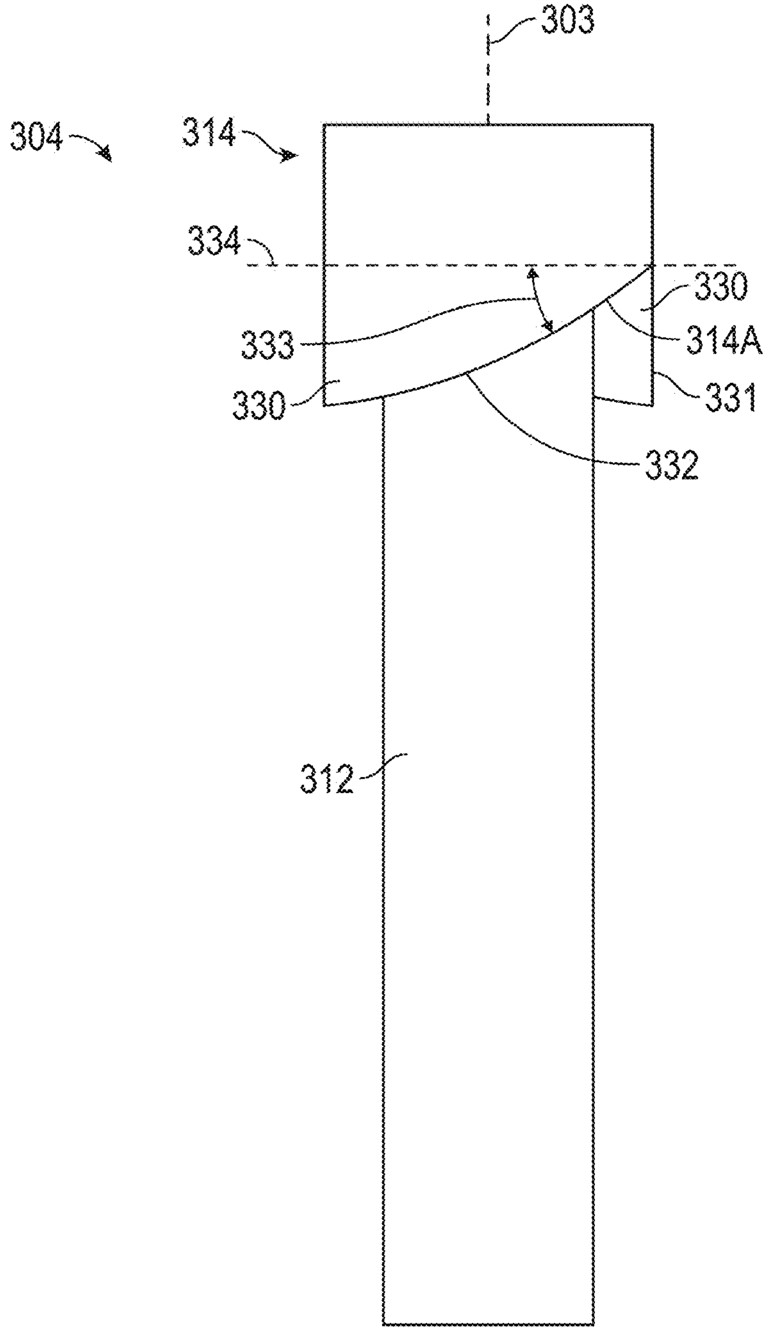
FIG. 3H is a side view of an example embodiment of a bolt that can be used with the release devices of FIGS. 3A-3G.

The head 314 and seat 301B may have correspondingly contoured surfaces to facilitate rotational disengagement. As shown in FIG. 3H, in some embodiments, the proximal surface 314A of the head 314 may be helical. In some embodiments, the head 314 may include proximal protrusions 330 forming the proximal surface 314A of the head 314. The proximal surface 314A may define a partial or incomplete thread. The proximal surface 314A may include a first surface 331 and an opposite a second surface 332, with each being helical to engage corresponding helical contours of the seat 301B. In some embodiments, the proximal surface 314A may be sloped or ramped, such as a linear surface. For example, the proximal surface 314A may form an angle 333 with a horizontal axis 334 that extends transverse to the longitudinal axis of the shaft. The angle 333 may be no more than 5 degrees, no more than 10 degrees, no more than 15 degrees, no more than 20 degrees, no more than 25 degrees, no more than 30 degrees, no more than 35 degrees, no more than 40 degrees, no more than 45 degrees.

The corresponding surface of the seat 301B of the connector 301 that contacts the proximal surface 314A may include a corresponding contour. The seat 301B may have a same shape as that of the protrusions 330. The seat 301B may thus be helical, curved, ramped, etc. Accordingly, when the head 314 engages with the seat 301B in the first rotational position 320, the proximal surface 314A may engage with the seat 301B to prevent or inhibit the bolt 304 from rotating in the second rotational direction 324 but may allow or facilitate the bolt 304 to rotate in the first rotational direction 323. The axial tension applied to the bolt 304 may in effect cause the proximal surface 314A to "slide down" the corresponding contour of the seat 301B.

Figure 4A:
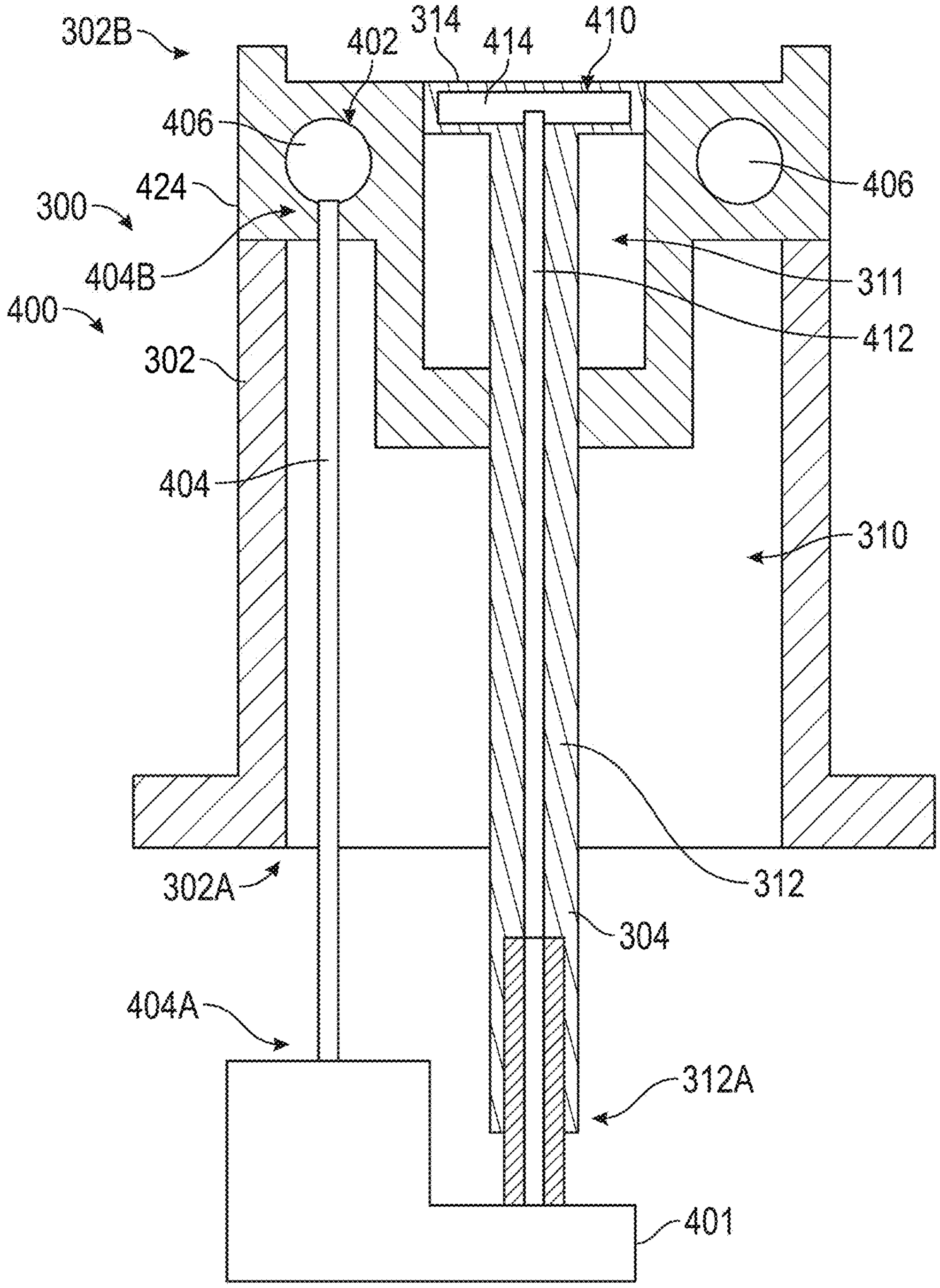
FIG. 4A is a cross-sectional view of an example embodiment of a cooling system for a release device that may be used with the release devices of FIGS. 3A-3H.
Figure 4B:
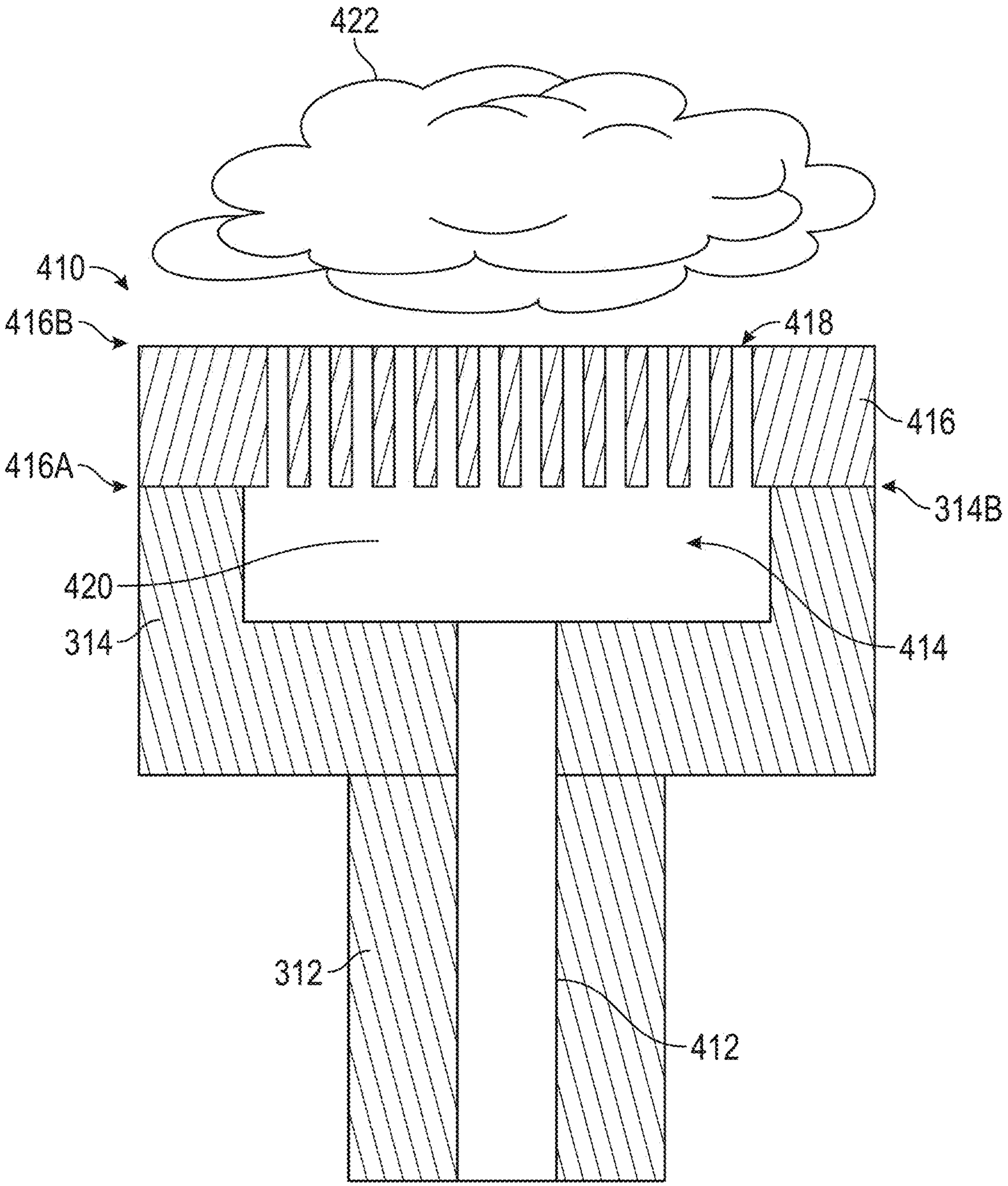
FIG. 4B is a cross-sectional view of an upper portion of an example embodiment of a cooling system for a bolt that can be used with any of the release devices of FIGS. 3A-4A.

FIGS. 4A and 4B illustrate a cooling system 400 that may be used with the release device 300. The cooling system 400 may be configured to cool the release device 300 during reentry of the rocket through the atmosphere. As shown in FIG. 4A, the body 302 may include a first cooling assembly 402 of the cooling system 400, and the bolt 304 may include a second cooling assembly 410 of the cooling system 400.

In some embodiments, the first cooling assembly 402 may include a first channel 404 and a second channel 406. The first channel 404 may extend axially through the body 302 of the release device 300 from the distal end 302B to the proximal end 302A of the body 302. A proximal end 404A of the first channel 404 may be positioned proximally to the proximal end 302A of the body 302. The first channel 404 may extend out of the body 302 past the proximal end 302A of the body 302. In some embodiments, the second channel 406 may be an annular (e.g., ring shaped) channel. The second channel 406 extends circumferentially around a central longitudinal axis of the body 302. The second channel 406 may be positioned at the distal end 302B of the body 302 so that the second channel 406 extends around the recess 311 of the channel 310. In some embodiments, the second channel 406 may extend around the channel 310. In some embodiments, the second channel 406 may be coupled to and/or in fluid communication with a distal end 404B of the first channel 404.

In some embodiments, the first channel 404 may be coupled to and/or in fluid communication with a circulation system 401. The circulation system 401 may be configured to pump a coolant through the first channel 404 and to and through the second channel 406. As the coolant flows through the second channel 406, the coolant draws heat away from (cools) the distal end 302B of the body 302.

In some embodiments, the second cooling assembly 410 may be positioned at least partially within the bolt 304. The second cooling assembly 410 may include a channel 412 and a recess 414. The channel 412 may extend axially through the shaft 312 of the bolt 304 from the proximal end 312A of the shaft 312 of the bolt 304. The recess 414 may extend through the head 314 of the bolt 304. The channel 412 may be coupled to and/or in fluid communication with the recess 414. In some embodiments, the channel 412 may be coupled to and/or in fluid communication with the circulation system 401, and/or a different circulation system. The circulation system 401 may be configured to pump a fluid, such as a coolant, into the recess 414 via the channel 412. The coolant may draw heat away from (cool) the head 314 of the bolt 304. In some embodiments, a fluid may be pumped to the recess 414 and exit the system at the head 314, as further described.

In some embodiments, the body 302 may include a material configured to transfer heat to the recess 414 in order to increase or maximize heat transfer to the coolant. The body 302 may include aluminum and/or any other thermally conductive material.

As shown in FIG. 4B, in some embodiments, the second cooling assembly 410 may include a cap 416. The cap 416 may include a plurality of channels 418 extending through the cap 416. The plurality of channels 418 may extend from a proximal end 416A of the cap 416 to a distal end 416B of the cap 416. The cap 416 may be coupled to the head 314 of the bolt 304 at a distal end 314B of the head 314. The cap 416 may be coupled to the head 314 so the plurality of channels 418 align with the recess 414.

In some embodiments, coolant 420 or other fluid in the recess 414 may be configured to boil when the coolant 420 is exposed to heat. In some embodiments, coolant 420 in the plurality of channels 418 may be configured to boil when the coolant 420 in the plurality of channels 418 is exposed to heat. The coolant 420 may draw in heat from (e.g., cool) the head 314 and/or the cap 416, or other portions of the bolt 304 or system. At least a portion of the coolant 420 in the recess 414 and/or the plurality of channels 418 may phase change to vapor 422 when a fluid portion of the coolant 420 boils. The coolant 420 may be configured to boil at a temperature below a melting or annealing temperature of the surrounding structure, such as that of the head 314 and/or the bolt 304. Accordingly, the fluid portion of the coolant 420 in the recess 414 and/or the plurality of channels 418 may remain below or at a boiling temperature of the coolant 420 when a temperature around the coolant 420 and/or the head 314 is above the boiling temperature of the coolant 420. Accordingly, the coolant 420 may prevent or inhibit a temperature of the head 314 and/or the cap 416 from raising above the boiling temperature of the coolant 420 and/or a melting or annealing temperature of the head 314, the bolt 304, and/or the cap 416. In some embodiments, the vapor 422 and/or heat in the coolant 420 may exit the recess 414 and/or the channels 418 by flowing through the plurality of channels 418 in the cap 416 and being injected to an exterior of the cap 416. When a fluid portion of the coolant 420 is heated and/or phase changes to vapor 422, the coolant 420 may expand causing the vapor 422 to be forced through the plurality of channels 418. In some embodiments, the coolant 420 may include water and/or any other liquid configured to boil at a temperature below a melting or annealing temperature of the head 314 and/or the bolt 304. In this manner, the vapor 422 exterior to the system may provide a vaporous heat shield between plasma and upper, exposed portions of the release device 300 (e.g., the head 314, the bolt 303, the body 302, etc.).

In some embodiments, the cap 416 may include a material configured to transfer heat to the recess 414 in order to increase or maximize heat transfer to the coolant 420. The cap 416 may include copper, aluminum, and/or any other material with a high thermal diffusivity.

As shown in FIG. 4A, in some embodiments, the body 302 may include an end cap 424. The end cap 424 may include the second channel 406. The end cap 424 may include any features and/or functions of the cap 416 (see FIG. 4B). As coolant (e.g., coolant 420 in FIG. 4B) flows through the second channel 406 in the end cap 424, the coolant may draw in heat from (e.g., cool) the body 302 and/or the end cap 424. At least a portion of the coolant in the second channel 406 may phase change to vapor when a fluid portion of the coolant boils. The coolant may be configured to boil at a temperature below a melting or annealing temperature of the surrounding structure, such as that of the body 302 and/or the end cap 424. Accordingly, the fluid portion of the coolant in the second channel 406 may remain below or at a boiling temperature of the coolant when a temperature around the coolant and/or the body 302 is above the boiling temperature of the coolant. Accordingly, the coolant may prevent or inhibit a temperature of the body 302 from raising above the boiling temperature of the coolant and/or above a melting or annealing temperature of the body 302. In some embodiments, the vapor and/or heat in the coolant may exit the second channel 406 by flowing through a plurality of channels (e.g., channels 418 in FIG. 4B) in the end cap 424 and being injected or otherwise emitted to an exterior of the end cap 424. In this manner, the vapor exterior to the system may provide a vaporous heat shield between plasma and the release device 300 (e.g., the heat 314, the bolt 303, the body 302, etc.).

Figure 5A:
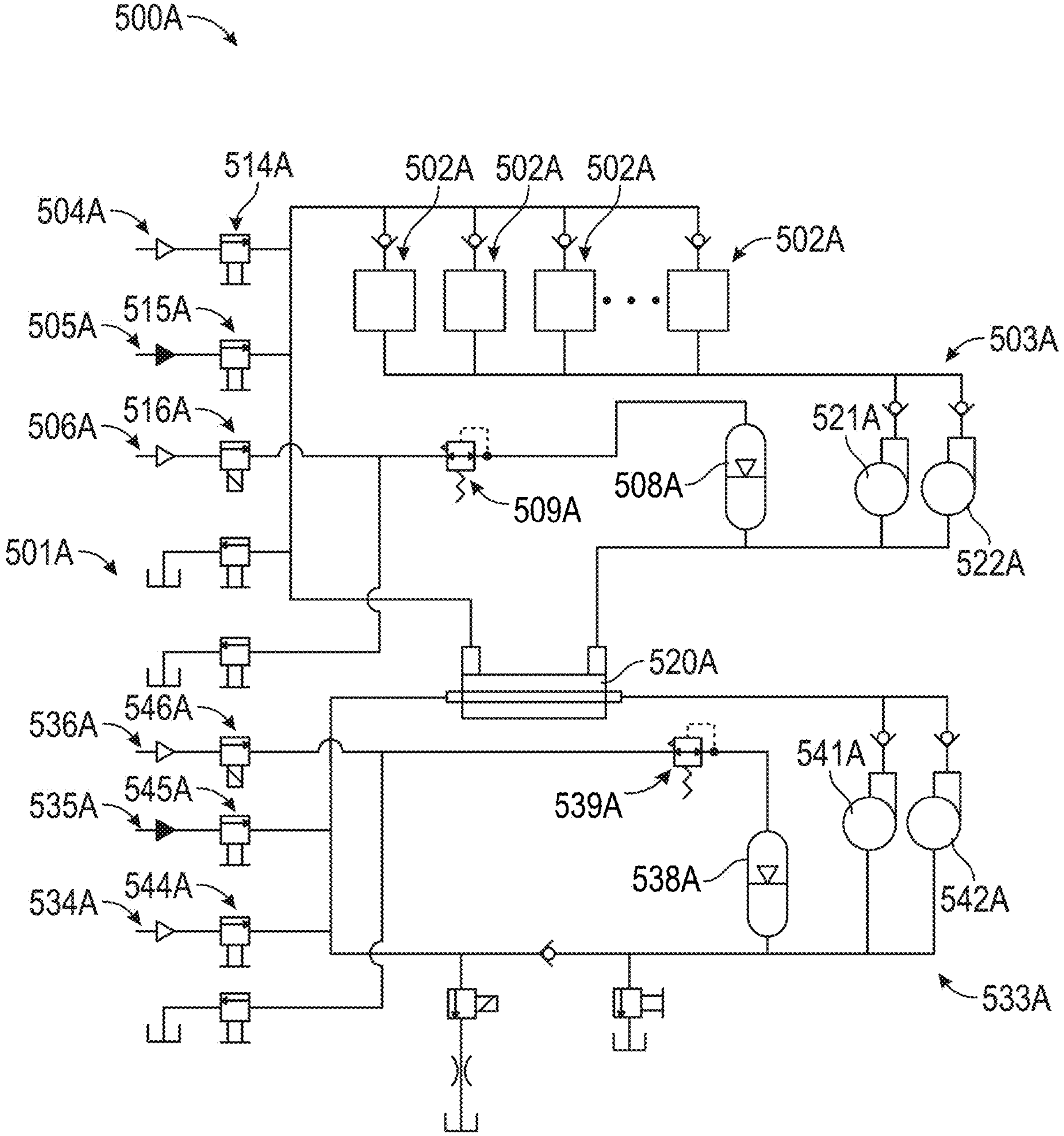
FIG. 5A is a schematic of an example embodiment of a cooling system architecture that can be used for any of the release devices of FIGS. 3A-4B, including a first flow path for providing coolant to the release devices, a second flow path for cooling coolant in the first flow path, and a head exchanger between the first flow path and the second flow path.
Figure 5B:
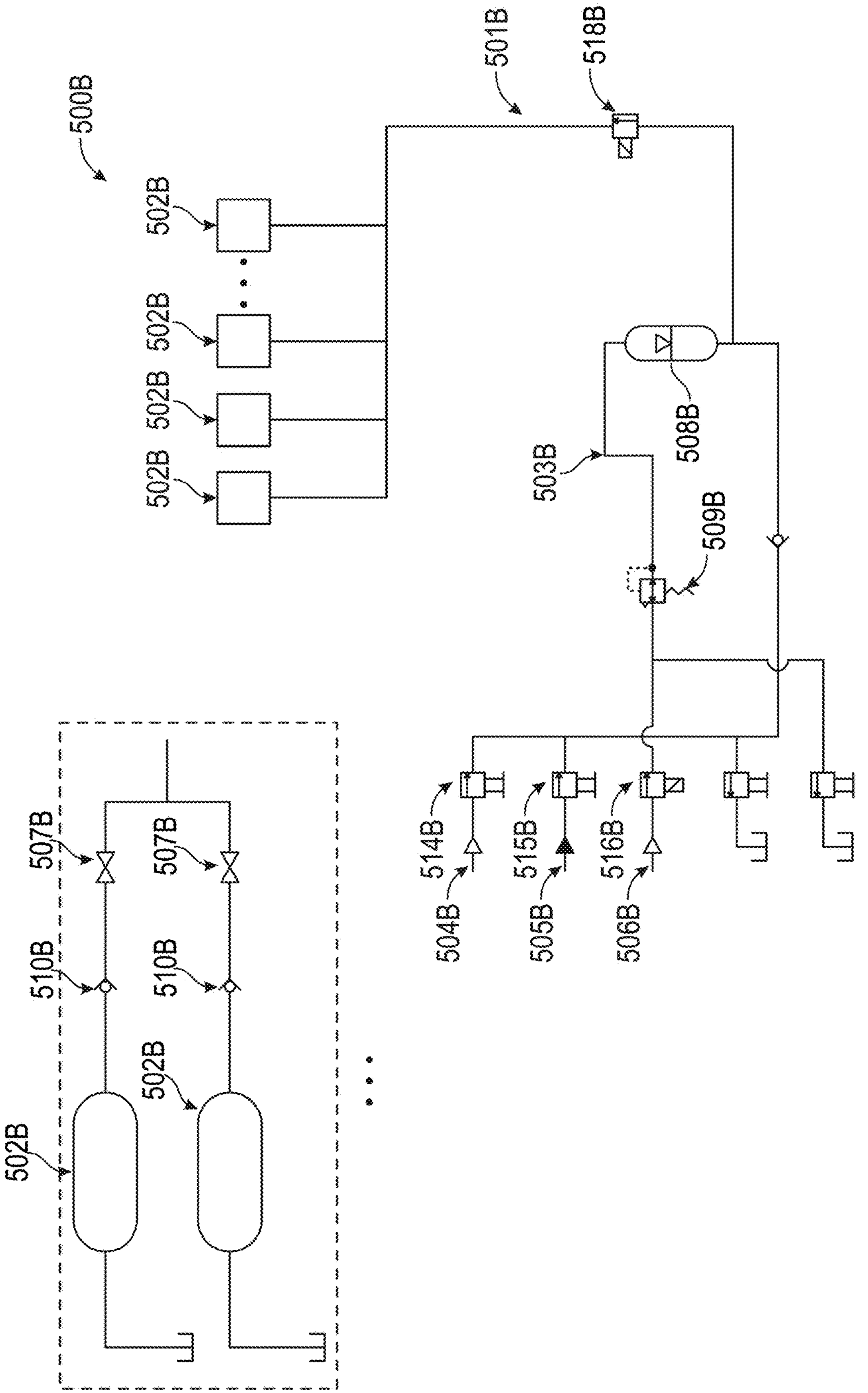
FIG. 5B is a schematic of another example embodiment of a cooling system architecture that can be used for any of the release devices of FIGS. 3A-4B, including a flow path for providing coolant to the release devices to passively cool the release devices.

FIGS. 5A and 5B illustrate schematics of cooling systems 500A and 500B that may be used with any of the release devices and systems described herein, such as those described with respect to FIGS. 2A-4B. In some embodiments, the cooling system 500A may include an active cooling system. In some embodiments, the cooling systems 500B may include a passive cooling system.

As shown in FIG. 5A, the cooling system 500A may include a circulation system 501A coupled to a plurality of release mechanisms 502A, which may be any of the release devices herein, for example the release devices as shown and described with respect to FIGS. 2A-4B. The circulation system 501A may be used in a closed loop for recirculating coolant, such as with the cooling system 400 of FIG. 4A. The circulation system 501A may include a first flow path 503A and a second flow path 533A. Coolant may be circulated through the first flow path 503A to the plurality of release mechanisms 502A. As the coolant flows through the plurality of release mechanisms 502A, the coolant may draw heat away from (e.g., cool) the plurality of respective release mechanisms 502A. The coolant may be circulated through the first flow path 503A from the plurality of release mechanisms 502A to a heat exchanger 520A. After the coolant passes through the heat exchanger 520A, the coolant may be circulated through the first flow path 503A back to the plurality of release mechanisms 502A.

In some embodiments, coolant may be circulated though the heat exchanger 520A through the second flow path 533A. The coolant in the second flow path 533A may enter the heat exchanger 520A at a lower temperature than a temperature of the coolant in the first flow path 503A when the coolant in the first flow path 503A enters the heat exchanger 520A. Accordingly, the heat exchanger 520A may transfer heat from the coolant in the first flow path 503A to the coolant in the second flow path 533A in order to cool the coolant in the first flow path 503A.

In some embodiments, the circulation system 501A may include a first cooling pump 521A and a first circulation pump 522A. The first cooling pump 521A may be configured to pump the coolant through the first flow path 503A during reentry of a rocket (e.g., the second stage 100) through the atmosphere. The first cooling pump 521A may be configured to pump the coolant through the first flow path 503A to provide the coolant to the plurality of release mechanisms 502A in order to cool the plurality of release mechanisms 502A. The first circulation pump 522A may be configured to circulate the coolant through the first flow path 503A when the rocket (e.g., the second stage 100) is in orbit in order to prevent or inhibit the coolant from freezing in supply lines of the cooling system 500A. The first cooling pump 521A may be a larger pump than the first circulation pump 522A. Accordingly, the first cooling pump 521A may be configured to generate a higher flow rate of coolant through the first flow path 503A than the first circulation pump 522A In some embodiments, the circulation system 501A may include a second cooling pump 541A and a second circulation pump 542A. The second cooling pump 541A may be configured to pump the coolant through the second flow path 533A during reentry of the rocket (e.g., the second stage 100) through the atmosphere. The second cooling pump 541A may be configured to pump the coolant through the second flow path 533A to provide the coolant to the heat exchanger 520A at a flow rate high enough to draw heat away from the coolant in the first flow path 503A. The second circulation pump 542A may be configured to circulate the coolant through the second flow path 533A when the rocket (e.g., the second stage 100) is in orbit in order to prevent or inhibit the coolant from freezing in supply lines of the cooling system 500A.

The first flow path 503A may include a first gas line 506A and/or a first coolant tank 508A. The first gas line 506A may be configured to provide pressurized gas to the first coolant tank 508A in order to pressurize the first coolant tank 508A and the coolant in the first flow path 503A. Pressurizing the first coolant tank 508A and the coolant in the first flow path 503A may prevent or inhibit the coolant in the first flow path 503A from changing phases when the coolant is heated or cooled. The first flow path 503A may include a first regulator 509A configured to regulate the pressure of the pressurized gas. The pressurized gas may include helium and/or any other suitable gas. The first regulator 509A may be set at a pressure of about 20 psia, about 30 psia, about 40 psia, about 45 psia, about 50 psia, about 55 psia, about 60 psia, and/or any value between the aforementioned values.

The second flow path 533A may include a second gas line 536A and/or a second coolant tank 538A. The second gas line 536A may be configured to provide pressurized gas to the second coolant tank 538A in order to pressurize the second coolant tank 538A and the coolant in the second flow path 533A. Pressurizing the second coolant tank 538A and the coolant in the second flow path 533A may prevent or inhibit the coolant in the second flow path 533A from changing phases when the coolant is heated or cooled. The second flow path 533A may include a second regulator 539A configured to regulate the pressure of the pressurized gas. The pressurized gas may include helium and/or any other suitable gas. The second regulator 539A may be set at a pressure of about 5 psia, about 10 psia, about 15 psia, about 20 psia, about 30 psia, about 40 psia, about 45 psia, and/or any value between the aforementioned values. The first regulator 509A may be set to a higher pressure than the second regulator 539A.

In some embodiments, the first flow path 503A may include a first air line 504A and a first coolant line 505A. The first air line 504A may include a valve 514A. The valve 514A may include a manual valve configured to be manually opened/closed. The valve 514A may include a normally closed valve. The valve 514A may be opened during ground processing (e.g., refurbishment) to prepare the cooling system 500A for a subsequent launch mission. When the valve 514A is opened, the first air line 504A may purge (e.g., drain) the coolant from the first flow path 503A. The first coolant line 505A may include a valve 515A. The valve 515A may include a manual valve configured to be manually opened/closed. The valve 515A may be opened during ground processing (e.g., refurbishment) to prepare the cooling system 500A for a subsequent launch mission. The valve 515A may be opened during ground processing in order to provide coolant to the first flow path 503A. The valve 515A may include a normally closed valve. The first gas line 506A may include a valve 516A. The valve 516A may include an electronic valve. The valve 516A may include a normally closed valve.

In some embodiments, the second flow path 533A may include a second air line 534A and a second coolant line 535A. The second air line 534A may include a valve 544A. The valve 544A may include a manual valve configured to be manually opened/closed. The valve 544A may include a normally closed valve. The valve 544A may be opened during ground processing (e.g., refurbishment) to prepare the cooling system 500A for a subsequent launch mission. When the valve 544A is opened, the second air line 534A may purge (e.g., drain) the coolant from the second flow path 533A. The second coolant line 535A may include a valve 545A. The valve 545A may include a manual valve configured to be manually opened/closed. The valve 545A may be opened during ground processing (e.g., refurbishment) to prepare the cooling system 500A for a subsequent launch mission. The valve 545A may be opened during ground processing in order to provide coolant to the second flow path 533A. The valve 545A may include a normally closed valve. The second gas line 536A may include a valve 546A. The valve 546A may include an electronic valve. The 546A may include a normally closed valve.

As shown in FIG. 5B, the cooling system 500B may include a circulation system 501B coupled to a plurality of release mechanisms 502B, which may be any of the release devices herein, for example the release devices as shown and described with respect to FIGS. 2A-4B. The circulation system 501A (of FIG. 5A) may be used in an "open loop" where coolant is expelled from the cooling system 500B, such as with the cooling assembly 410 of FIG. 4B. The circulation system 501B of FIG. 5B may include a flow path 503B. In some embodiments, the coolant may be conveyed to the plurality of release mechanisms 502B via the flow path 503B. The flow path 503B may be thermally conditioned to prevent or inhibit icing in the flow path 503B and/or the cooling system 500B. In some embodiments, the coolant may draw heat away from a bolt of each release mechanism of the plurality of release mechanisms 502B. In some embodiments, the coolant may boil to prevent or inhibit a temperature of a bolt of each of the plurality of release mechanisms 502B from increasing to a melting or annealing temperature of the bolt. The vapor coolant may then exit the release mechanisms 502B through channels in the release mechanisms 502B that are open to the atmosphere and/or plasma around a rocket during reentry through the atmosphere, as described herein.

In some embodiments, the flow path 503B may include an air line 504B, a coolant line 505B, and a gas line 506B. The air line 504B may include a valve 514B. The valve 514B may include a manual valve configured to be manually opened/closed. The valve 514B may include a normally closed valve. The valve 514B may be opened during ground processing (e.g., refurbishment) to prepare the cooling system 500B for a subsequent launch mission. When the valve 514B is opened, the air line 504B may purge (e.g., drain) the coolant from the first flow path 503A. The coolant line 505B may include a valve 515B. The valve 515B may include a manual valve configured to be manually opened/closed. The valve 515B may include a normally closed valve. The valve 515B may be opened during ground processing (e.g., refurbishment) to prepare the cooling system 500A for a subsequent launch mission. The valve 515B may be opened during ground processing in order to provide coolant to the flow path 503B. The gas line 506B may include a valve 516B. The valve 516B may include an electronic valve. The valve 516B may include a normally closed valve.

The flow path 503B may include an accumulator 508B. The accumulator 508B may be configured to store coolant at a desired pressure. The flow path 503B may include a regulator 509B configured to regulate the pressure of the coolant in the accumulator 508B and/or the flow path 503B. The regulator 509B may be set at a pressure of about 5 psia, about 10 psia, about 15 psia, about 20 psia, about 30 psia, about 40 psia, about 45 psia, and/or any value between the aforementioned values.

The flow path 503B may include a valve 518B between the accumulator 508B and the plurality of release mechanisms 502B. The valve 518B may include an electronic valve. The valve 518B may include a normally closed valve. During reentry of a rocket (e.g., the second stage 100) through the atmosphere, the valve 518B may be opened. As described above, channels in the release device 502B are open to the atmosphere and/or plasma around the rocket during reentry through the atmosphere. A pressure of the atmosphere and/or plasma around the rocket may be less than the pressure of the coolant in the accumulator 508B and/or the flow path 503B. When the valve 518B is opened, the difference in pressure may draw the coolant through the plurality of release mechanisms 502B to cool the release mechanisms 502B.

Each of the release mechanisms 502B may include a metering valve 507B and a one-way valve 510B. The metering valve 507B may be configured to restrict or control the flow rate of coolant into the corresponding release mechanism 502B to ensure that coolant is distributed evenly to each release mechanisms 502B. The metering valve 507B may prevent or inhibit too much coolant from flowing the release mechanism 502B. The one-way valve 510B may be configured to prevent pressure buildup in the release mechanism 502B generated when the coolant boils and phase changes to vapor from reversing a direction of flow of the coolant in the flow path 503B.

Various modifications to the implementations described in this disclosure will be readily apparent to those skilled in the art, and the generic principles defined herein may be applied to other implementations without departing from the spirit or scope of this disclosure. Thus, the disclosure is not intended to be limited to the implementations shown herein but is to be accorded the widest scope consistent with the claims, the principles and the novel features disclosed herein. The word "example" is used exclusively herein to mean "serving as an example, instance, or illustration." Any implementation described herein as "example" is not necessarily to be construed as preferred or advantageous over other implementations, unless otherwise stated.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described as such. Additionally, other implementations are within the scope of the following claims. In some cases, the actions recited in the claims may be performed in a different order and still achieve desirable results.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A release device for a separation system of a rocket, the release device comprising:

a tubular body extending along a longitudinal axis from a proximal end to a distal end and defining a channel extending axially therethrough; and a bolt comprising an axially extending shaft configured to be positioned within the channel of the tubular body and a transversely elongated head on a distal end of the shaft, wherein the bolt is configured to rotate about the longitudinal axis from a first position where the head is configured to engage an expendable component and a second position where the head is configured to disengage from the expendable component to thereby allow the bolt to translate proximally through the channel and allow the expendable component to separate from the rocket, and wherein a cooling channel extends through the bolt configured to flow coolant therethrough.

2. The release device of claim 1 further comprising a transverse actuation arm configured to rotate the shaft.

3. The release device of claim 1 further comprising a biasing element configured to bias the bolt proximally.

4. The release device of claim 1, wherein the head is configured to engage a seat of the expendable component, the seat defining a transversely elongated slot.

5. The release device of claim 1, wherein a proximal surface of the head is helical.

6. The release device of claim 1, wherein the release device comprises cooling channels extending through the body configured to flow coolant therethrough.

7. The release device of claim 1, wherein the cooling channel extending through the bolt extends to a distal opening at a distal end of the bolt.

8. The release device of claim 1, wherein the expendable component comprises an adaptor or a load spreader.

9. A release device for an expendable component of a rocket, the release device comprising:

a body comprising a channel extending through the body from a proximal end to a distal end;

a bolt comprising a shaft and a head on a distal end of the shaft; and a cooling system configured to flow coolant to the body and through the bolt during reentry of the rocket into an atmosphere so that the release device is reusable.

10. The release device of claim 9, wherein the bolt is configured to heat up to cause the coolant to boil to prevent a temperature of the bolt from raising above a melting or annealing temperature of the bolt.

11. The release device of claim 9, wherein the cooling system comprises a recess in the head of the bolt, wherein the recess is configured to hold the coolant that boils to cool the head of the bolt during reentry of the rocket through the atmosphere.

12. The release device of claim 11, wherein the bolt comprises a cap coupled to a distal surface of the bolt, wherein the cap comprises a plurality of channels, and wherein the coolant is configured to boil in the plurality of channels to vent vapor out of the recess in the head and to the atmosphere.

13. The release device of claim 12, wherein the cap comprises a material with a high thermal diffusivity.

14. The release device of claim 13, wherein the bolt comprises titanium or the body comprises aluminum.

15. The release device of claim 11, wherein the body comprises an end cap and the cooling system comprises an annular channel in the end cap.

16. A method of operating a release device with a component for securement with a rocket, the method comprising:

positioning the component at a distal end of the release device;

distally translating a bolt of the release device into a recess of the component, the bolt comprising a cooling channel extending therethrough; and rotating the bolt from a second position to a first position to engage a head of the bolt with the component.

17. The method of claim 16 further comprising rotationally biasing the bolt towards the first position.

18. The method of claim 16 further comprising proximally biasing the bolt.

19. The method of claim 16 further comprising rotating the bolt from the first position to the second position to disengage the bolt from the component and proximally translating the bolt out of the recess of the component to retract the bolt into a body of the release device.

20. The method of claim 19 further comprising cooling the bolt during reentry of the rocket through an atmosphere.

* * * * *